(12) United States Patent
Hiramoto et al.

(10) Patent No.: US 6,999,596 B2
(45) Date of Patent: Feb. 14, 2006

(54) CAPACITOR SENSOR

(75) Inventors: Masayoshi Hiramoto, Yokohama (JP); Kazumoto Doi, Yokohama (JP); Yoshinobu Yasuno, Suginami-ku (JP); Tatsuhiro Sawada, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/509,221

(22) PCT Filed: Apr. 4, 2003

(86) PCT No.: PCT/JP03/04328

§ 371 (c)(1),
(2), (4) Date: Sep. 24, 2004

(87) PCT Pub. No.: WO03/086013

PCT Pub. Date: Oct. 16, 2003

(65) Prior Publication Data

US 2005/0163336 A1 Jul. 28, 2005

(30) Foreign Application Priority Data

Apr. 5, 2002 (JP) .............................. 2002-103300

(51) Int. Cl.
*H04R 25/00* (2006.01)
(52) U.S. Cl. ........................ 381/369; 381/174; 381/191
(58) Field of Classification Search ................ 381/173, 381/174, 190, 191, 113, 116, 369; 29/25.41, 29/25.42; 367/140, 170, 181

See application file for complete search history.

(56) References Cited

U.S. PATENT DOCUMENTS

| | | | | |
|---|---|---|---|---|
| 5,272,758 | A | * | 12/1993 | Isogami et al. ............. 381/191 |
| 6,512,833 | B2 | * | 1/2003 | Himori et al. .............. 381/174 |
| 2002/0172389 | A1 | * | 11/2002 | Pavlovic ..................... 381/369 |

FOREIGN PATENT DOCUMENTS

JP      2001-145196      5/2001

* cited by examiner

*Primary Examiner*—Huyen Le
(74) *Attorney, Agent, or Firm*—Pearne & Gordon LLP

(57) ABSTRACT

A condenser sensor (10) comprises an electrically conductive case (20) having an opening portion (22a) formed therein and an opposing portion (22b) opposing to and spaced apart from the opening portion (22a); a fixed electrode (30) received in the electrically conductive case (20) through the opening portion (22a); an electrically conductive diaphragm (51) accommodated in the electrically conductive case (20), the electrically conductive diaphragm (51) spaced apart from the fixed electrode (30) and opposing to the opening portion (22a); an electrically conductive diaphragm supporting member (52) disposed in the electrically conductive case (20) to support the diaphragm (51); a circuit packaging board (60) disposed in the electrically conductive case (20) to be held in electrical contact with the fixed electrode (30) and the diaphragm (51) respectively through the electrically conductive case (20) and the diaphragm supporting member (52); and deformation protecting member (32) for protecting the opposing portion (22b) from being deformed, in which the deformation protecting member (32) intervenes between the electrically conductive case (20) and the diaphragm (51), the deformation protecting member (32) is disposed inwardly of the circumference (51b) of an oscillatable portion (51a) of the diaphragm (51).

21 Claims, 23 Drawing Sheets

CAPACITOR SENSOR

TECHNICAL FIELD OF INVENTION

The present invention is related to a condenser sensor available for a microphone, an oscillation sensor, and the like.

BACKGROUND ART

Up until now, there have been proposed a wide variety of conventional condenser microphones. One typical example of the conventional condenser microphone is disclosed in Japanese Patent Laid-Open Publication No. 2001-145196. The conventional condenser microphone disclosed therein comprises an electrically conductive capsule, an electrically conductive reinforcement plate having a circumferential ring portion at its circumferential end and disposed in the electrically conductive capsule, and an electrically conductive oscillation diaphragm spaced apart from the electrically conductive reinforcement plate and disposed in the electrically conductive capsule. The conventional condenser microphone is characterized in that the electrically conductive capsule and the electrically conductive reinforcement plate collectively form a cavity under the state that the circumferential ring portion of the electrically conductive reinforcement plate is held in engagement with the electrically conductive capsule. The conventional condenser microphone thus constructed is known as a condenser sensor.

In the conventional condenser microphone, the electrically conductive capsule has a relatively deformation-resistant portion in the form of a ring shape opposing to and to be held in engagement with the circumferential ring portion of the electrically conductive reinforcement plate so as to prevent the deformation of the electrically conductive capsule from being transmitted to the electrically conductive reinforcement plate.

Further, in the conventional condenser microphone, the deformation of the electrically conductive capsule is tolerated within the cavity formed by the electrically conductive capsule and the electrically conductive reinforcement plate so as to prevent the deformation of the electrically conductive capsule from being transmitted to the electrically conductive reinforcement plate.

The conventional condenser microphone thus constructed as previously mentioned, however, encounters a drawback that the frequency characteristics of the conventional condenser microphone tend to be aggravated resulting from the fact that the deformation of the electrically conductive capsule is tolerated, and the cavity in the electrically conductive capsule is deformed.

It is therefore an object of the present invention to provide a condenser sensor which can prevent the frequency characteristics from being aggravated.

DISCLOSURE OF THE INVENTION

In accordance with one aspect of the present invention, there is provided a condenser sensor, comprising: an electrically conductive case having an opening portion formed therein and an opposing portion opposing to and spaced apart from the opening portion; a fixed electrode received in the electrically conductive case through the opening portion; an electrically conductive diaphragm accommodated in the electrically conductive case, the electrically conductive diaphragm spaced apart from the fixed electrode and opposing to the opening portion; an electrically conductive diaphragm supporting member disposed in the electrically conductive case to support the diaphragm; a circuit packaging board disposed in the electrically conductive case to be held in electrical contact with the fixed electrode and the diaphragm respectively through the electrically conductive case and the diaphragm supporting member; and a deformation protecting member for protecting the opposing portion from being deformed, in which the deformation protecting member intervenes between the electrically conductive case and the diaphragm, the deformation protecting member is disposed inwardly of a circumference of an oscillatable portion of the diaphragm.

In accordance with this construction, the condenser sensor according to the present invention can avert the aggravation of the frequency characteristics of the condenser sensor caused by the deformation of the opposite portion of the electrically conductive case.

In the condenser sensor according to the present invention, the fixed electrode and the deformation protecting member may be integrally formed with each other.

In accordance with this construction, the condenser sensor according to the present invention can reduce the number of constitution parts in comparison with the condenser sensor in which the fixed electrode and the deformation protecting member are respectively constituted by parts different from each other.

In the condenser sensor according to the present invention, the diaphragm may be made of a resin film having a multiple-layer electrically conductive material.

In accordance with this construction, the diaphragm thus constructed is reduced in weight in comparison with the diaphragm made of a metal material alone.

In the condenser sensor according to the present invention, the diaphragm supporting member may be made of a composite body including an electrically conductive material and an electrically insulating material.

In accordance with this construction, the condenser sensor according to the present invention can the reduce stray capacitance between the electrically conductive case and the diaphragm in comparison with the condenser sensor having the diaphragm supporting member made of an electrically conductive material alone.

In the condenser sensor according to the present invention, the electrically conductive case and the fixed electrode may be respectively formed with acoustic apertures, a total area of the acoustic aperture formed in the electrically conductive case is larger than a total area of the acoustic aperture formed in the fixed electrode, and the total area of the acoustic aperture formed in the fixed electrode is larger than one thousandth of a total area of the oscillatable portion of the diaphragm but smaller than one tenth of the total area of the oscillatable portion of the diaphragm.

In accordance with this construction, the condenser sensor according to the present invention can transmit an acoustic pressure at a sufficient level, and obtain a high sensitivity.

In the condenser sensor according to the present invention, a thickness of the diaphragm may be greater than 1 $\mu$m but less than 3 $\mu$m.

In accordance with this construction, the condenser sensor according to the present invention can enhance its sensitivity as well as improve its yield.

In the condenser sensor according to the present invention, a base resonance frequency of the diaphragm may be greater than 10 KHz but less than 35 KHz.

In accordance with this construction, the condenser sensor according to the present invention can enhance its sensitivity as well as improve its yield.

The condenser sensor according to the present invention may further comprise an electret member attached to the fixed electrode, and in which a thickness of the electret member may be greater than 3 μm but less than 25 μm.

In accordance with this construction, the condenser sensor according to the present invention can enhance its sensitivity as well as improve its yield.

The condenser sensor according to the present invention may further comprise an electrically conductive cloth, and in which the electrically conductive case and the fixed electrode may be respectively formed with acoustic apertures, and the acoustic aperture formed in the electrically conductive case may be covered by the electrically conductive cloth.

In accordance with this construction, the condenser sensor according to the present invention can prevent exterior electromagnetic noise from entering into the acoustic aperture formed in the electrically conductive case. This leads to the fact that the condenser sensor according to the present invention can prevent exterior electromagnetic noise from reaching to the diaphragm.

In the condenser sensor according to the present invention, the electrically conductive cloth may be made of a composite body including an electrically conductive material and an electrically insulating material.

In accordance with this construction, the electrically conductive cloth thus constructed is easy in production in comparison with the electrically conductive cloth made of an electrically conductive material alone.

The condenser sensor according to the present invention may further comprise an electrically conductive spacer intervening between the electrically conductive case and the fixed electrode, and in which the electrically conductive case and the fixed electrode may be respectively formed with acoustic apertures.

In accordance with this construction, the condenser sensor thus constructed can prevent exterior electromagnetic noise from reaching to the diaphragm in comparison with an other type of condenser sensor, in which the electrically conductive case and the fixed electrode are held in contact with each other, resulting from the fact that the condenser sensor thus constructed is longer than the other type of condenser sensor in the distance between the surface of the electrically conductive case having apertures formed therein and the surface of the fixed electrode.

In the condenser sensor according to the present invention, the fixed electrode may have an aperture portion having the acoustic aperture formed therein and a remaining portion other than the aperture portion, and the acoustic aperture formed in the electrically conductive case is at least partly opposing to the remaining portion of the fixed electrode.

In accordance with this construction, the condenser sensor thus constructed can prevent exterior electromagnetic noise from reaching to the diaphragm in comparison with another type of condenser sensor, in which the acoustic aperture formed in the electrically conductive case is entirely opposing to the remaining portion of the fixed electrode.

In the condenser sensor according to the present invention, the circumferential portion of the fixed electrode may be different in shape from that of the diaphragm.

In accordance with this construction, the condenser sensor according to the present invention can decrease a stray capacitance between the fixed electrode and a non-oscillatable portion of the diaphragm, and accordingly, increase its output voltage in comparison with a condenser sensor, in which the fixed electrode and the diaphragm are identical in the shape of circumferential portion.

In the condenser sensor according to the present invention, the electrically conductive case may have a surface opposing to the diaphragm supporting member, and the electrically conductive case may further comprise an electrically insulating member attached to the surface of the electrically conductive case.

In accordance with this construction, the condenser sensor according to the present invention can reduce the number of constitution parts in comparison with a condenser sensor, in which the electrically insulting member and the electrically conductive case are respectively constituted by parts different from each other.

The electrically conductive case according to the present invention may further comprise an electrically insulating member intervening between the electrically conductive case and the electrically conductive diaphragm supporting member, and in which the electrically insulating member may be separated from the electrically conductive case.

In accordance with this construction, the condenser sensor according to the present invention can be simple in construction, and accordingly, easy in production, in comparison with a condenser sensor, in which the electrically insulating member is attached to the electrically conductive case.

In the electrically condenser sensor according to the present invention, the electrically insulating member may be made of a composite body including a metal base material and an electrically insulating material coated on a surface of the metal base material.

In accordance with this construction, the electrically insulating member can have a rigidity more than that of an electrically insulating member made of an electrically insulating material alone.

The condenser sensor according to the present invention may further comprise an electrically conductive member intervening between the electrically conductive diaphragm supporting member and the circuit packaging board, and in which the circuit packaging board may be electrically connected the electrically conductive diaphragm supporting member through the electrically conductive member.

In accordance with this construction, the height of the condenser sensor according to the present invention can be readily adjusted by the electrically conductive member.

The condenser sensor according to the present invention may further comprise: a terminal electrically connectable to an exterior appliance; and a noise filtering member electrically connected to the terminal to filter out a noise, and in which the noise filtering member is mounted on the circuit packaging board.

In accordance with this construction, the condenser sensor according to the present invention can filter out exterior noises inputted through the terminal connectable to an exterior appliance.

The condenser sensor according to the present invention may further comprise a varistor element electrically connected to the terminal, and mounted on the circuit packaging board.

In accordance with this construction, the condenser sensor according to the present invention can improve its ESD (electrostatic discharge) resistance.

The condenser sensor according to the present invention may further comprise an element embedded in the circuit packaging board.

In accordance with this construction, the condenser sensor according to the present invention can narrow a gap between the diaphragm and the circuit packaging board, and accordingly, lower its height.

The condenser sensor according to the present invention may further comprise an element formed on the circuit packaging board by way of at least one of a printing process and a thin film processing.

In accordance with this construction, the condenser sensor according to the present invention can narrow a gap between the diaphragm and the circuit packaging board, and accordingly, lower its height in comparison with a condenser sensor having an element formed on the circuit packaging board by way of soldering.

The condenser sensor according to the present invention may further comprise a bare chip mounted on the circuit packaging board.

In accordance with this construction, the condenser sensor according to the present invention can narrow a gap between the diaphragm and the circuit packaging board, and accordingly, lower its height in comparison with a condenser sensor having a package of a chip mounted on the circuit packaging board.

In the condenser sensor according to the present invention, the electrically conductive case may have a surface opposing to the diaphragm supporting member, and the condenser sensor may further comprise: an electrically insulating member attached to the surface of the electrically conductive case; and an electrically conductive member electrically connecting the electrically conductive diaphragm supporting member with the circuit packaging board.

In accordance with the above construction, the condenser sensor according to the present invention, in which the electrically conductive case and the fixed electrode are electrically connected with each other regardless of whether or not the electrically insulating member attached to the surface of the electrically conductive member is removed, can readily produced in comparison with a condenser sensor in which the electrically conductive case and the fixed electrode are not electrically connected with each other until the electrically insulating resin formed on the surface of the electrically conductive case is removed.

The condenser sensor according to the present invention may comprise: an electrically conductive case having an opening portion formed therein and an opposing portion opposing to and spaced apart from the opening portion; a fixed electrode pressed into the electrically conductive case through the opening portion; an electrically conductive diaphragm accommodated in the electrically conductive case and spaced apart from the fixed electrode; an electrically conductive diaphragm supporting member disposed in the electrically conductive case to support the diaphragm; and a circuit packaging board disposed in the electrically conductive case to be held in electrical contact with the fixed electrode and the diaphragm respectively through the electrically conductive case and the diaphragm supporting member.

In accordance with this construction, the condenser sensor according to the present invention can avert the aggravation of the frequency characteristics of the condenser sensor caused by the deformation of the electrically conductive case.

BRIEF DESCRIPTION OF THE DRAWINGS

The features and advantage of a condenser sensor according to the present invention will become apparent as the description proceeds when taken in conjunction with the accompanying drawings.

FIG. 3($b$) is a diagram showing a relationship among an effective capacitance of the condenser sensor shown in FIG. 1, a stray capacitance between a fixed electrode and a diaphragm, and an input capacitance of a field-effect transistor, hereinlater simply referred to as "FET".

FIG. 6($b$) is a bottom view of the diaphragm and the diaphragm supporting member of the condenser sensor shown in FIG. 1.

FIG. 12($b$) is a rear view similar to FIG. 12($a$) but showing another example of the FET mounted on the circuit packaging board of the condenser sensor shown in FIG. 1.

BEST MODE OF CARRYING OUT THE PRESENT INVENTION

The preferred embodiments of the present invention will be described hereinafter with reference to the drawings.

(A First Preferred Embodiment)

The construction of a first embodiment of a front electret type condenser sensor will be described first.

Figure 1:
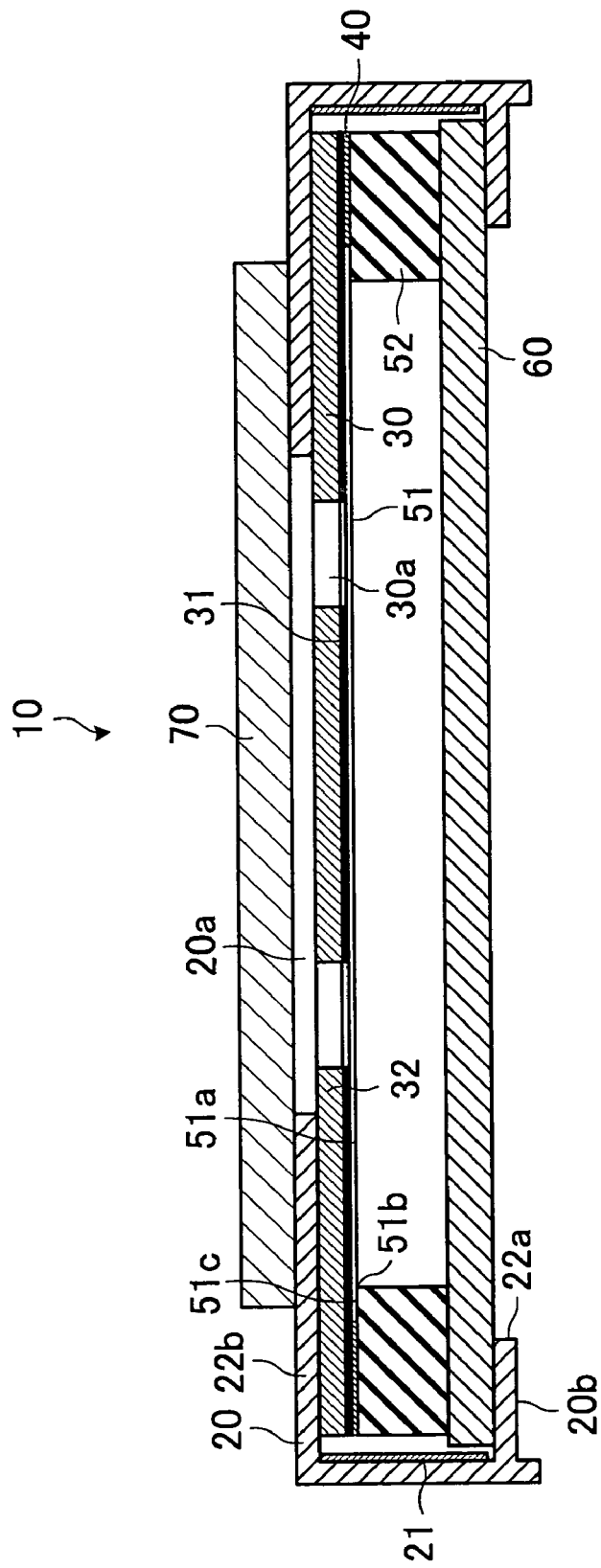
FIG. 1 is a cross-sectional side view showing a first embodiment of the condenser sensor.

The present embodiment of the front electret type condenser sensor 10 is shown in FIG. 1 as comprising an electrically conductive case 20 having an opening portion 22a formed therein and an opposite portion 22b opposing to and spaced apart from the opening portion 22a. The electrically conductive case 20 is formed with an acoustic aperture 20a. The condenser sensor 10 further comprises an electrically insulating member 21 attached to an inner surface of the electrically conductive case 20, a fixed electrode 30 disposed in and held in contact with the electrically conductive case 20, an electret member 31 deposited on a surface of the fixed electrode 30 opposite to a surface of the fixed electrode 30 held in contact with the electrically conductive case 20, a spacer 40 disposed in the electrically conductive case 20 and held in contact with the electret member 31, and an diaphragm 51 disposed in the electrically conductive case 20 and held in contact with the spacer 40. The diaphragm 51 is spaced apart from the fixed electrode 30 and opposing to the opening portion 22a of the electrically conductive case 20. The condenser sensor 10 further comprises a diaphragm supporting member 52 disposed in the electrically conductive case 20 to support the diaphragm 51, a circuit packaging board 60 disposed in the electrically conductive case 20 to be held in contact with the diaphragm supporting member 52, and an electrically conductive cloth 70 disposed outwardly of the electrically conductive case 20 to cover the acoustic aperture 20a of the electrically conductive case 20. The electrically conductive case 20 and the circuit packaging board 60 are combined to define a hollow space.

Figure 2:
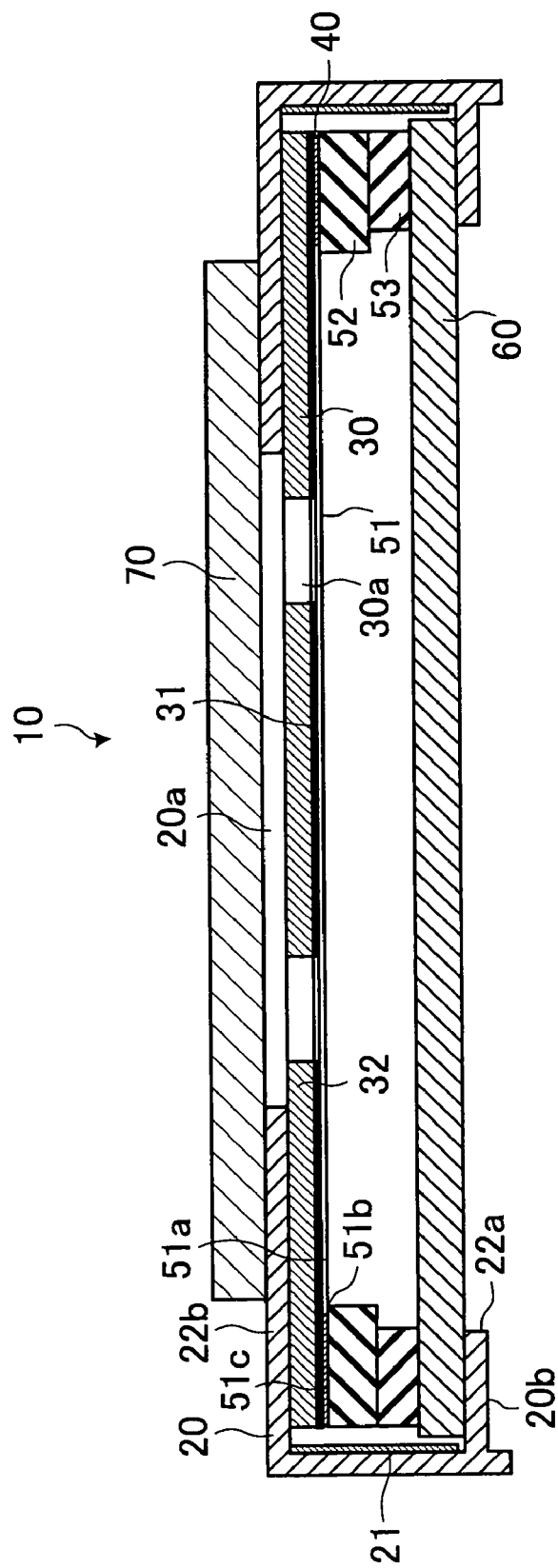
FIG. 2 is a cross-sectional side view similar to FIG. 1 but showing another example of the condenser sensor shown in FIG. 1.

In addition, the condenser sensor 10 may further comprise an electrically conductive member 53 intervening between the diaphragm supporting member 52 and the circuit packaging board 60 as shown in FIG. 2 so as to facilitate adjustment of its height. The description hereinafter will be directed to the condenser sensor 10 under the assumption that the condenser sensor 10 comprises an electrically conductive member 53.

Further, the electrically conductive case 20 may be made of, preferably, a metal relatively low in cost, resistant to corrosion, and high dielectric, such as for example, aluminum, alloy of nickel, zinc, and copper, SUS (Steel special Use Stainless), and/or the like. In addition, the surface of the metal may be coated with gold for the purpose of enhancing its electrical conductivity and corrosion resistance.

Still further, the electrically insulating member 21 may be made of, preferably, a relatively low dielectric resin, or a composite body including a resin and a metal for the purpose of enhancing its moldability and workability and decreasing the amount of stray capacitance, which is not related to the sensitivity of the condenser sensor 10. The electrically insulating member 21 is made of, for example, a resin film fusion-spliced or deposited on the electrically conductive case 20, and/or an epoxy adhesive. The resin film may include polyethylene terephthalate, hereinlater simply referred to as "PET", polypropylene, hereinlater simply referred to as "PP", polyethylene naphthalate, hereinlater simply referred to as "PEN", fluorinated ethylene propylene, hereinlater simply referred to as "FEP", and/or the like. Further the more, the electrically insulating member 21 may have any thickness and arrangement as long as the electrically conductive case 20 is not held in electrical or physical contact with the diaphragm supporting member 52 and the electrically conductive member 53 because of the fact that the dielectric constant of a resin is, in general, greater than that of an air gap. For example, the electrically insulating member 21 may be scattered on an inner surface of the electrically conductive case 20 in such a manner that the electrically insulating member 21 has a plurality of portions respectively fusion-spliced or deposited on the inner surface of the electrically conductive case 20. Further the more, the electrically insulating member 21 should have, preferably, such a thickness and arrangement so that the stray capacitance among the electrically conductive case 20, the diaphragm supporting member 52, and the electrically conductive member 53 is decreased.

The electrically conductive case 20 having the electrically insulating member 21 attached thereto can be readily produced through the steps of drawing a metal sheet having, for example, an electrically insulating resin fusion-spliced or deposited thereon into a shape of the case, and removing the electrically insulating resin formed on the surface of the electrically conductive case 20 having the acoustic aperture 20a therein by way of, for example, the blast method or the like.

The fixed electrode 30 is formed with an acoustic aperture 30a. Preferably, the total area of the acoustic aperture 20a formed in the electrically conductive case 20 should be larger than the total area of the acoustic aperture 30a formed in the fixed electrode 30 so as to avert the reflection or resonance of an external acoustic pressure. For example, in the case that the condenser sensor 10 is used as a microphone, the total area of the acoustic aperture 30a formed in the fixed electrode 30 should be, preferably, larger than one thousandth of the total area of a portion 51a of the diaphragm 51 not fixed by the diaphragm supporting member 52, hereinlater simply referred to as "oscillatable portion" of the diaphragm 51, but smaller than one tenth of the total area of the oscillatable portion 51a of the diaphragm 51. This means that the sensitivity of the condenser sensor 10 tends to be aggravated to an insufficient level under the state that the total area of the acoustic aperture 30a formed in the fixed electrode 30 is larger than one tenth of the total area of the oscillatable portion 51a of the diaphragm 51 resulting from the fact that the effective capacitance between the fixed electrode 30 and the diaphragm 51 is reduced. Further, the acoustic pressure received by the condenser sensor 10 and transmitted into the diaphragm 51 becomes insufficient under the state that the total area of the acoustic aperture 30a formed in the fixed electrode 30 is smaller than one thousandth of the total area of the oscillatable portion 51a of the diaphragm 51. In the case, on the other hand, that the condenser sensor 10 is used as an oscillation sensor, the above condition is no longer applicable resulting from the fact that the acoustic pressure is not required to be transmitted thereinto.

The condenser sensor 10 further comprises a deformation protecting member 32 disposed inwardly of the circumference of the oscillatable portion 51a of the diaphragm 51 to protect the opposite portion 22b of the electrically conductive case 20 from being deformed. This leads the fact that the deformation protecting member 32 can avert the aggravation of the frequency characteristics of the condenser sensor 10 caused by the deformation of the opposite portion 22b of the electrically conductive case 20. In the present embodiment of the condenser sensor 10, the fixed electrode 30 and the deformation protecting member 32 are integrally formed with each other, thereby reducing the number of constitution parts in comparison with the condenser sensor in which the fixed electrode and the deformation protecting member are respectively constituted by parts different from each other. According to the present invention, on the other hand, the fixed electrode 30 and the deformation protecting member 32 may be respectively constituted by parts different from each other.

In addition, the fixed electrode 30 may be made of, preferably, a metal such as, for example, SUS (Steel special Use Stainless), brass coated with corrosion-resistant material, e.g., nickel, alloy of nickel, zinc, and copper, and/or the like. The surface of the metal may be coated with gold for the purpose of enhancing its electrical conductivity and corrosion resistance. Further, the fact that the fixed electrode 30 can be made of material stronger in bending strength than the electrically conductive case 20 leads to the fact that the condenser sensor 10 can easily realize required strength and stability even though the condenser sensor 10 is made small and slim.

The electret member 31 may be preferably made of a FEP film, thermally fusion-spliced or deposited on the fixed electrode 30. Before the fixed electrode 30 is inserted into the electrically conductive case 20, the electret member 31 is in advance highly electrically charged by corona discharge or electron beam.

The spacer 40 may be made of a resin high in electrically insulation, relatively low in hygroscopicity, high in workability, and resistant to plastic deformation and stress-induced destruction, preferably selected from PET, PP, polyphenylen sulfide, hereinlater simply referred to as "PPS", PEN, and/or any combination thereof.

The diaphragm 51 may be made of an electrically conductive and corrosion-resistant material selected from Au, Pt, Ti, and/or any combination thereof. Preferably, the diaphragm 51 may be made of a multiple-layer material obtained by superimposing an electrically conductive material such as for example Au, Ni, Pt, Ti, V, W, Ta, and/or any combination thereof on an electrically conductive polymeric film or an electrically insulating resin film such as for example PET, PP, PPS, PEN, and/or any combination thereof by a vacuum deposition method or a sputtering method. The diaphragm 51 made of a resin film having an electrically conductive material superimposed thereon is less in weight than the diaphragm 51 made of a metal material alone. This leads to the fact that the diaphragm 51 made of a resin film having an electrically conductive material superimposed thereon can enhance the sensitivity of the condenser sensor 10 in comparison with the diaphragm 51 made of a metal material alone. In addition, the diaphragm 51 is disposed in the electrically conductive case 20 to be held in electrical contact with the diaphragm supporting member 52. For example, in the case that the diaphragm 51 is made of a multiple-layer material having a metal material superimposed on an electrically insulating resin as described hereinearlier, the metal coated surface of the diaphragm 51 can be bonded on the diaphragm supporting member 52 with an epoxy adhesive to facilitate electrical connection between the diaphragm 51 and the diaphragm supporting member 52.

The diaphragm supporting member 52 may be made of a material, preferably, high in mechanical strength to a degree that on the diaphragm 51 can be constantly imparted a tension at a predetermined level. More preferably, the diaphragm supporting member 52 may be made of a metal material selected from SUS, alloy of nickel, zinc, and copper, brass, and/or any combination thereof, or a composite body including a metal material and a resin material, for example, an composite body including an electrically conductive material and a electrically insulating material.

Similar to the diaphragm supporting member 52, the electrically conductive member 53 may be preferably made of a metal material, or a composite body including a metal material and a resin material.

The electrically conductive case 20 is electrically insulated from the diaphragm supporting member 52 and the electrically conductive member 53 because of the fact that the electrically conductive case 20 is spaced apart from the diaphragm supporting member 52 and the electrically conductive member 53 across the electrically insulating member 21 and an air gap formed therebetween.

The circuit packaging board 60 includes an impedance converting device and an amplifying circuit, not shown in the drawings, disposed in the electrically conductive case 20. The impedance converting device may be selected from, for example, a junction field effect transistor, hereinlater referred to as "JFET", a metal-oxide semiconductor field-effect transistor, hereinlater referred to as "MOSFET", and/or the like. The impedance converting device has a pattern forming a gate facing to and held in electrical contact with the electrically conductive member 53 and another pattern forming a source facing to and held in electrical contact with a portion 20b of the electrically conductive case 20. This leads to the fact that any change in electrical potential resulting from any change in capacitance between the fixed electrode 30 and the diaphragm 51 can be detected as a change in resistance between the source and a drain of the impedance converting device. As will be best shown in the drawings, the circuit packaging board 60 is held in pressing contact with the portion 20b of the electrically conductive case 20 by a curling or caulking method to have the source of the impedance converting device held in electrical contact with the portion 20b of the electrically conductive case 20. Alternatively, the circuit packaging board 60 may be connected with the portion 20b of the electrically conductive case 20 by way of ultrasonic bonding or welding to have the source of the impedance converting device held in electrical contact with the portion 20b of the electrically conductive case 20.

The electrically conductive cloth 70 serves to prevent exterior electromagnetic noise from entering into the acoustic aperture 20a formed in the electrically conductive case 20 in addition to preventing dust from entering into the acoustic aperture 20a formed in the electrically conductive case 20. This leads to the fact that the electrically conductive cloth 70 serves to prevent exterior electromagnetic noise from reaching to and influencing on the diaphragm 51.

The electrically conductive cloth 70 may be made of, for example, a metal fiber, a compound fiber including polyester plated with carbon or metal, a composite body including polyester and metal fiber, and/or a composite body including polyester and filler metal compounded therein. Preferably, the electrically conductive cloth 70 may be made of a composite body including an electrically insulating cloth and an electrically conductive surface layer deposited on the electrically insulating cloth by a sputtering method, a vacuum deposition method, a metal plating method, and/or the like. The electrically conductive cloth 70 made of a composite body including an electrically insulating material and an electrically conductive material is easy in production in comparison with the electrically conductive cloth 70 made of an electrically conductive material alone.

The electrically conductive case 20 and the electrically conductive cloth 70 may be readily held in electrically contact with each other in such a manner that the electrically conductive case 20 is attached to the electrically conductive cloth 70 with a resin adhesive, electrically conductive two-sided adhesive tape, or the like. In addition, the electrically conductive cloth 70 may further comprise a water resistant surface made of fluorine compound, opposite to a surface held in contact with the electrically conductive case 20.

Although only the cross-sectional side view of the condenser sensor 10 is shown in FIGS. 1 and 2, the condenser sensor 10 may be in the form of any shape such as, for example, a cylindrical shape, a square pole shape, or the like.

Figure 3:
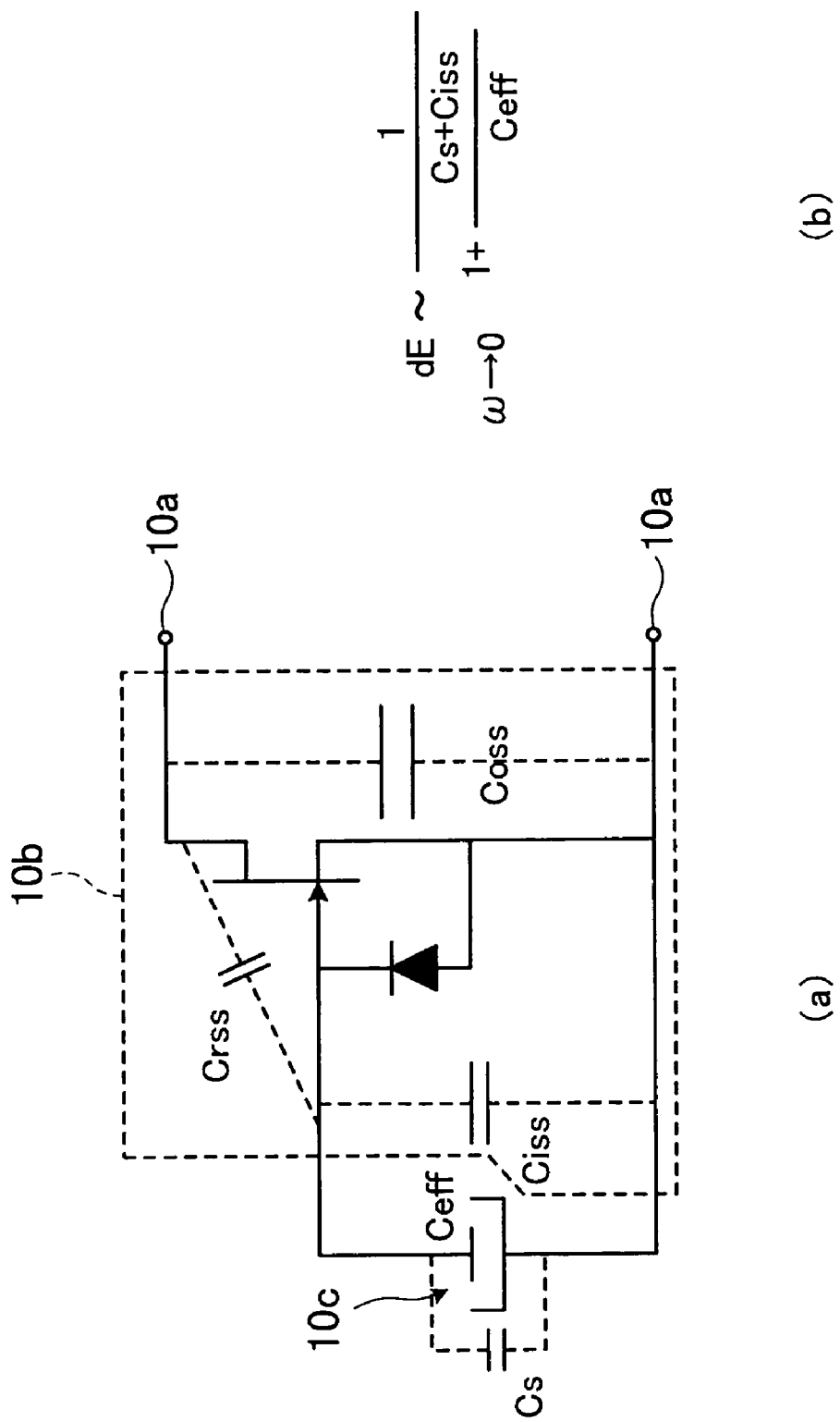
FIG. 3($a$) is a schematic circuit diagram showing an example of the condenser sensor shown in FIG. 1.

In the case that the condenser sensor 10 has an FET as an impedance converting device, the condenser sensor 10 forms a circuit shown in FIG. 3(a) as comprising a terminal 10a connectable to an exterior appliance, an integrated circuit (hereinlater simply referred to as "IC") chip 10b mounted on the circuit packaging board 60 having the FET and a diode thereon, and a capacitor element 10c constituted by the fixed electrode 30 and the diaphragm 51. The relationship among the effective capacitance (Ceff) of the condenser sensor 10, the stray capacitance (Cs) between the fixed electrode 30 and the diaphragm 51, and the input capacitance (Ciss) of the FET is considered to be represented by an expression shown in FIG. 3(b). As will be seen from the expression shown in FIG. 3(b), the output voltage is increased as the stray capacitance (Cs) is decreased.

Figure 4:
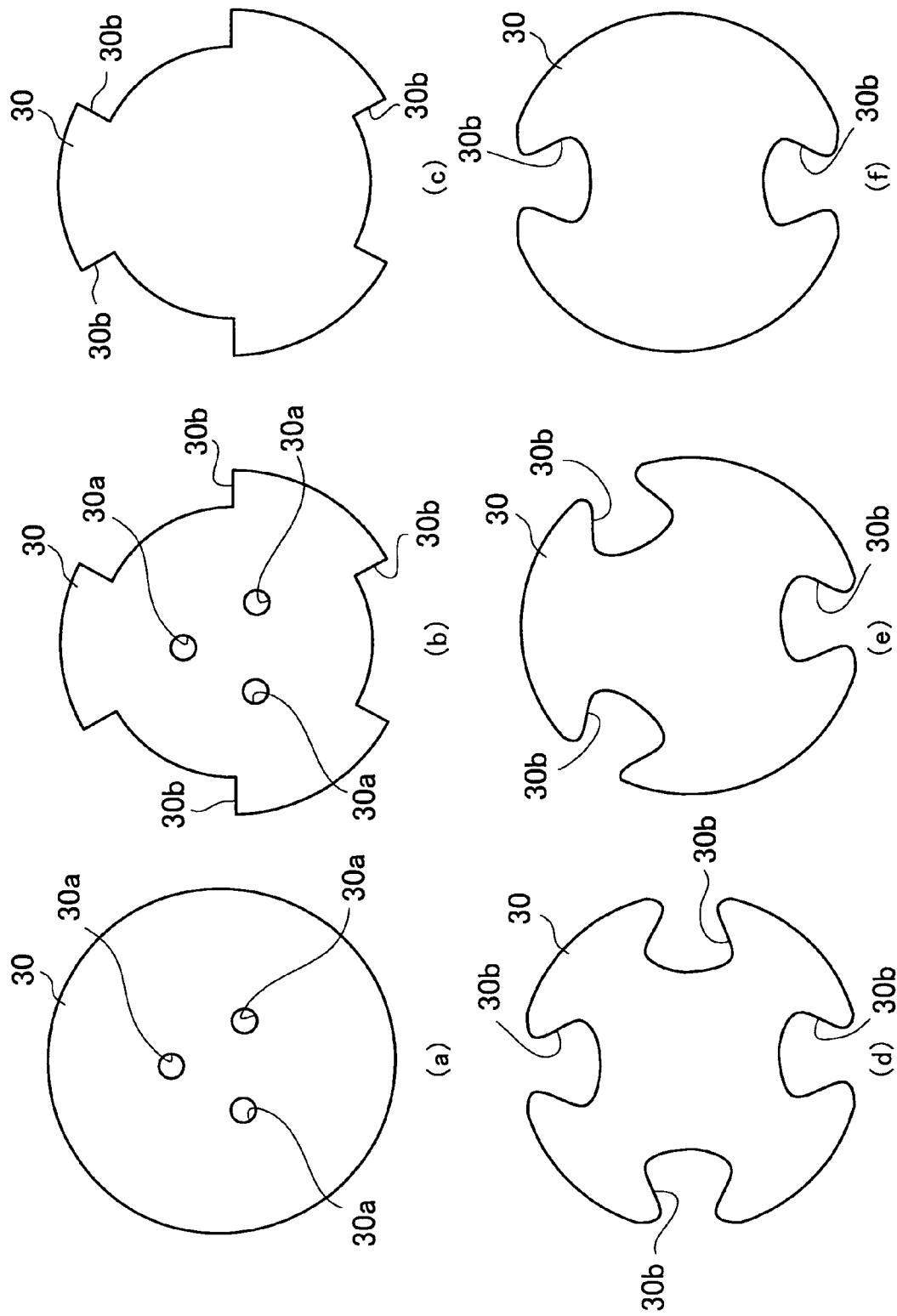
FIGS. 4($a$) through ($f$) are plan views each showing an example of a fixed electrode of the condenser sensor shown in FIG. 1.

For example in the case that the condenser sensor 10 is in the form of a cylindrical shape, and the diaphragm 51 is in the form of a circular shape, the stray capacitance between the fixed electrode 30 and the diaphragm 51 is decreased under the condition that the fixed electrode 30 is in the form of a shape shown in FIG. 4.

The fixed electrode 30 shown in FIG. 4(a) is in the form of a circular shape and formed with three acoustic apertures 30a. On the other hand, the fixed electrode 30 shown in FIG. 4(b) is different from the fixed electrode 30 shown in FIG. 4(a) in the shape of the circumferential portion of the fixed electrode 30 because of the fact that the fixed electrode 30 shown in FIG. 4(b) is further formed with a plurality of cutout portions 30b along the circumference of the fixed electrode 30 so as to reduce the stray capacitance between the fixed electrode 30 and a portion 51c of the diaphragm 51 other than the oscillatable portion 51a of the diaphragm 51, hereinlater simply referred to as "non-oscillatable portion" of the diaphragm 51. The cutout portions 30b of the fixed electrode 30 may oppose to, for example, the oscillatable portion 51a of the diaphragm 51.

The fixed electrode 30 shown in FIG. 4(c) is formed with a plurality of cutout portions 30b partly opposing to the oscillatable portion 51a of the diaphragm 51 to have acoustic pressure transmit from the electrically conductive case 20 to the diaphragm 51 through portions of the cutout portions 30b of the fixed electrode 30, which are not opposing to the oscillatable portion 51a of the diaphragm 51. Further, the fixed electrode 30 shown in FIG. 4(c) has no acoustic apertures 30a shown in FIG. 4(b) resulting from the fact that the portion of the cutout portions 30b of the fixed electrode 30 serves as acoustic apertures in place of the acoustic apertures 30a shown in FIG. 4(b).

If the total area of the acoustic apertures 30a formed in the fixed electrode 30 shown in FIG. 4(a) is equal to the total area of the portions of the cutout portions 30b of the fixed electrode shown in FIG. 4(c), through which acoustic pressure is transmitted from the electrically conductive case 20 to the diaphragm 51, the fixed electrode 30 shown in FIG. 4(c) can enhance the sensitivity of the condenser sensor 10 in comparison with the fixed electrode 30 shown in FIG. 4(a) because of the fact that the fixed electrode 30 shown in FIG. 4(c) as a whole opposes to a central section of the oscillatable portion 51a of the diaphragm 51, which forms a large effective oscillation range while, on the other hand the fixed electrode 30 shown in FIG. 4(a) has acoustic apertures 30a opposing to the central section of the oscillatable portion 51a of the diaphragm 51. For the similar reason, the fixed electrode 30 may be, preferably, in the form of a shape shown in any one of FIG. 4(d) through FIG. 4(f).

Figure 5:
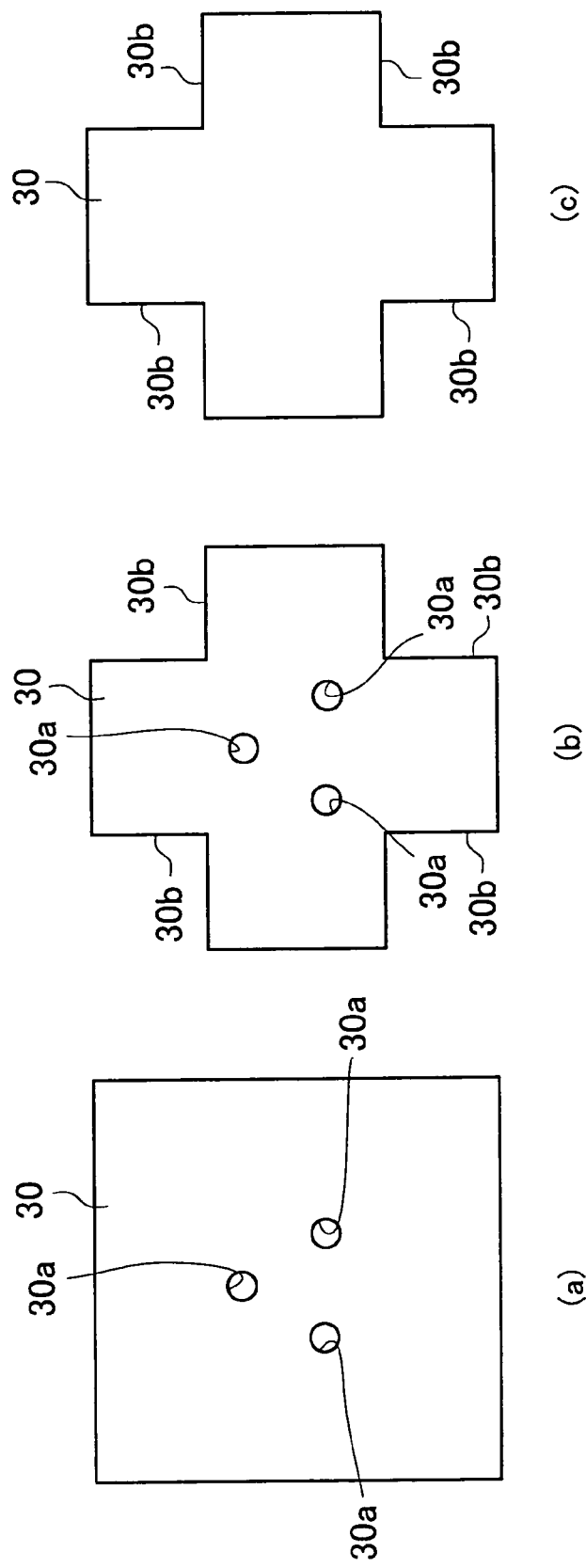
FIGS. 5($a$) through ($c$) are plan views similar to FIGS. 4($a$) through ($f$) but each showing another example of the fixed electrode of the condenser sensor shown in FIG. 1.

In addition, in the case that the condenser sensor 10 is in the form of a square pole shape, and the diaphragm 51 is in the form of a square shape, the stray capacitance between the fixed electrode 30 and the diaphragm 51 is decreased under the condition that the fixed electrode 30 is in the form of a shape shown in FIG. 5.

The fixed electrode 30 shown in FIG. 5(a) is in the form of a quadrangle shape and formed with three acoustic apertures 30a. On the other hand, the fixed electrode 30 shown in FIG. 5(b) is different from the fixed electrode 30 shown in FIG. 5(a) in the shape of the circumferential portion of the fixed electrode 30 because of the fact that the fixed electrode 30 shown in FIG. 5(b) is further formed with a plurality of cutout portions 30b along the circumference of the fixed electrode 30 so as to reduce the stray capacitance between the fixed electrode 30 and the non-oscillatable portion 51c of the diaphragm 51. The cutout portions 30b of the fixed electrode 30 may oppose to, for example, the oscillatable portion 51a of the diaphragm 51.

The fixed electrode 30 shown in FIG. 5(c) is formed with a plurality of cutout portions 30b partly opposing to the oscillatable portion 51a of the diaphragm 51 to have acoustic pressure transmit from the electrically conductive case 20 to the diaphragm 51 through portions of the cutout portions 30b of the fixed electrode 30, which are not opposing to the oscillatable portion 51a of the diaphragm 51. Further, the fixed electrode 30 shown in FIG. 5(c) has no acoustic apertures 30a shown in FIG. 5(b) resulting from the fact that the cutout portions 30b of the fixed electrode 30 partly serve as acoustic apertures in place of the acoustic apertures 30a shown in FIG. 5(b).

If the total area of the acoustic apertures 30a formed in the fixed electrode 30 shown in FIG. 5(a) is equal to the total area of the portions of the cutout portions 30b of the fixed electrode shown in FIG. 5(c), through which acoustic pressure is transmitted from the electrically conductive case 20 to the diaphragm 51, the fixed electrode 30 shown in FIG. 5(c) can enhance the sensitivity of the condenser sensor 10 in comparison with the fixed electrode 30 shown in FIG. 5(a) because of the fact that the fixed electrode 30 shown in FIG. 5(c) as a whole opposes to a central section of the oscillatable portion 51a of the diaphragm 51, which forms a large effective oscillation range while, on the other hand the fixed electrode 30 shown in FIG. 5(a) has acoustic apertures 30a opposing to the central section of the oscillatable portion 51a of the diaphragm 51.

Figure 6:
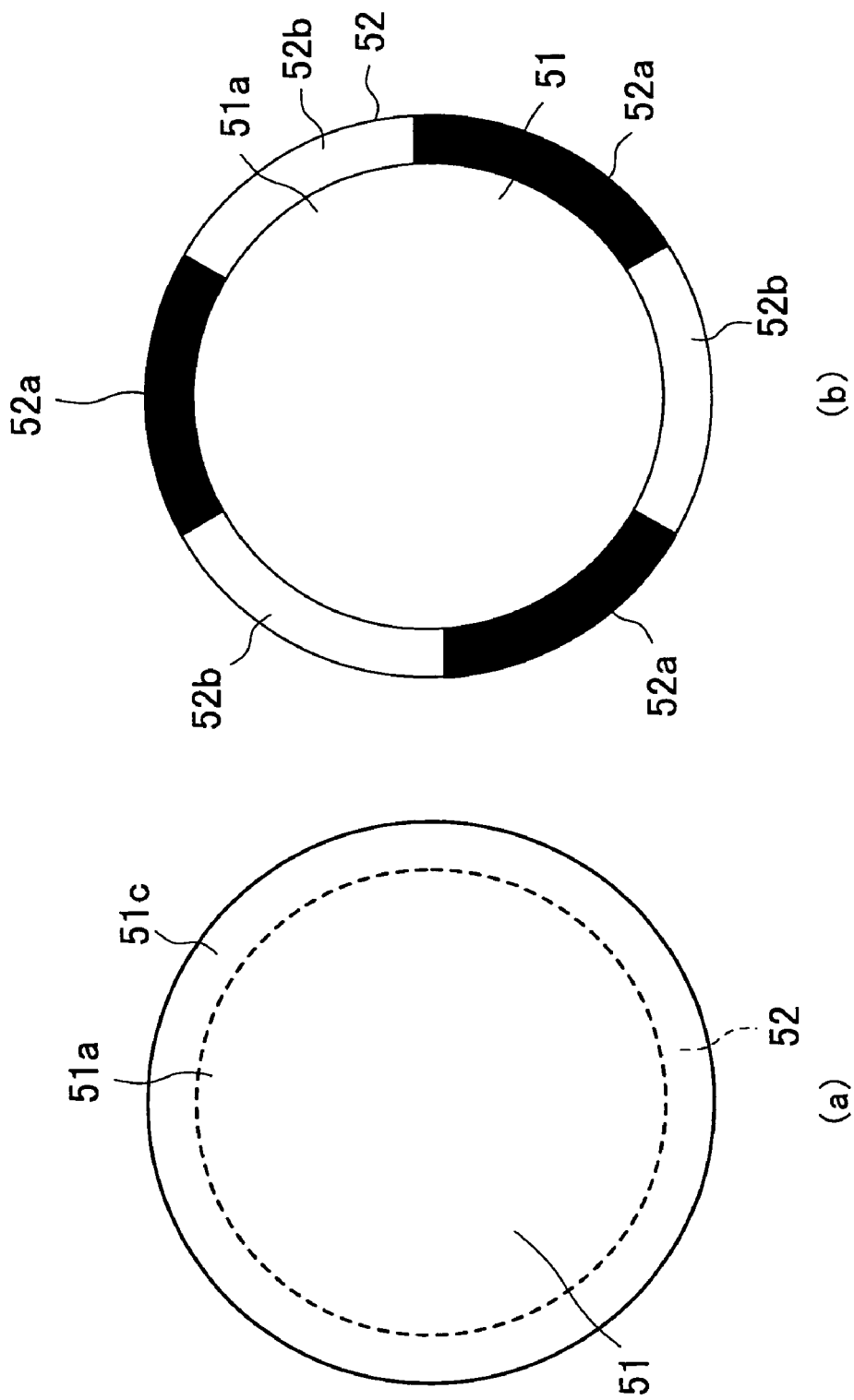
FIG. 6($a$) is a top view of the diaphragm and a diaphragm supporting member of the condenser sensor shown in FIG. 1.

Further, in the case that the condenser sensor 10 is in the form of a cylindrical shape, and the diaphragm supporting member 52 is in the form of a circular shape, the stray capacitance between the diaphragm supporting member 52 and the electrically conductive case 20 is decreased and the sensitivity of the condenser sensor 10 is enhanced under the condition that the diaphragm supporting member 52 is made of a composite body including an electrically conductive material 52a and an electrically insulating material 52b as shown in FIG. 6. Here, the diaphragm supporting member 52 shown in FIG. 6 is readily available. As the diaphragm supporting member 52 may be used, for example, an electrically insulating resin integrally formed with a metal material.

Still further, the stray capacitance between the fixed electrode 30 and the electrically conductive member 53 is decreased and the sensitivity of the condenser sensor 10 is enhanced under the condition that the electrically conductive member 53 is identical in construction with the diaphragm supporting member 52.

Figure 7:
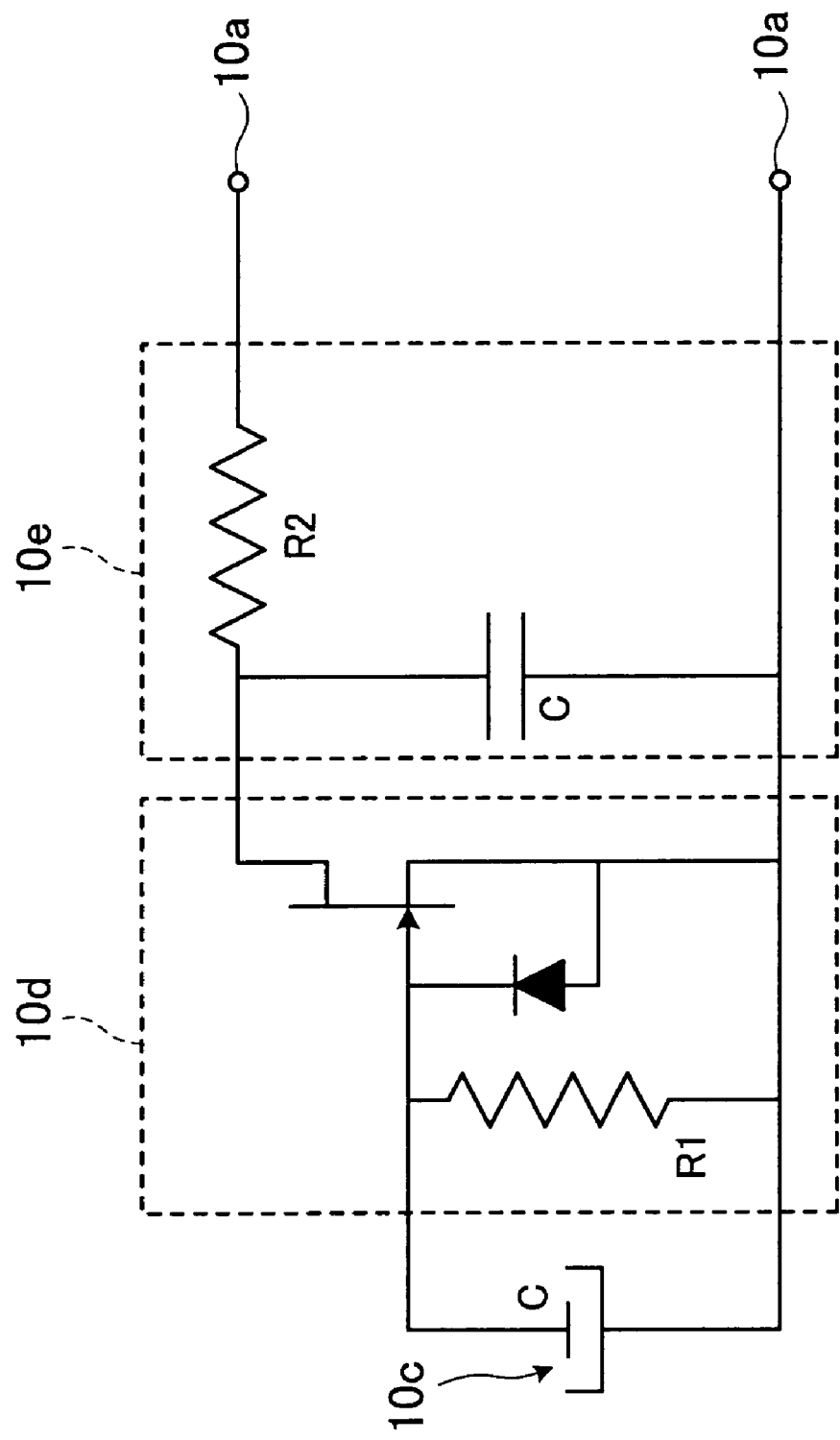
FIG. 7 is a schematic circuit diagram similar to FIG. 3($a$) but showing another example of the condenser sensor shown in FIG. 1.

As will be best shown in FIG. 7, the circuit packaging board 60 may have an IC chip 10d and a CR (condenser resistor) low pass filter 10e mounted thereon. The IC chip 10d includes a high-resistance element R1 and is designed to release excessive electric charge on the FET, the diode, and the gate of the FET so as to enhance its output response. The CR low pass filter 10e includes a capacitor element C and a resistance element R2, and is designed to filter out noises. The condenser sensor 10 having the CR low pass filter 10e electrically connected between the drain and the source of the FET can filter out exterior noises inputted through the terminal 10a.

In place of the CR low pass filter 10e electrically connected between the drain and the source of the FET, the condenser sensor 10 may have a noise filtering member constituted by a CRL (condenser resistor load) circuit having an inductive load L, an RL (resistor load) circuit, a bypass condenser circuit having at least one capacitor element C, and/or the like so as to filter out noises between the drain and source of the FET. The exterior noises inputted through the terminals 10a include noises caused by radio waves emitted from cellular mobile phones when, for example, the condenser sensor 10 is used as a condenser microphone forming part of a cellular mobile phone.

The condenser sensor 10 may further comprise a varistor element between the drain and the source of the FET in order to improve its ESD (electrostatic discharge) resistance.

Here, the resistance of the high-resistance element R1 forming part of the IC chip 10d is, preferably, in the range of 100 Mohm to 20 Gohm, and, more preferably, in the range of 1 Gohm to 10 Gohm. The capacitance of the capacitor element C forming part of the CR low pass filter 10e is, preferably, in the range of 10 pF to 10 nF. The resistance of the resistance element R2 forming part of the CR low pass filter 10e is in the range of 10 ohm to 1000 ohm.

Examples the condenser sensor 10 thus constructed as previously mentioned and their optimal constructions and characteristics will be described hereinlater.

FIRST EXAMPLE

As a first example of the condenser sensor 10 is produced a condenser microphone having a height of 1.4 mm and being in the form of a cylindrical shape with a diameter of 6 mm. Constituent elements forming part of the first example of the condenser sensor 10 are as follows. The electrically conductive case 20 is made of an alloy of nickel, zinc, and copper having a thickness of 0.12 mm, and the electrically insulating member 21 is made of a PET film fusion-spliced on the alloy of nickel, zinc, and copper forming the electrically conductive case 20. The fixed electrode 30 is made of an SUS material having a thickness of 0.2 mm and an FEP material having a thickness of 2.5 $\mu$m deposited on the SUS material, and electrically charged with voltage of 280V. The diaphragm supporting member 52 and the electrically conductive member 53 are made of a SUS material having a thickness of 0.3 mm. The diaphragm 51 is made of a PET film having various thicknesses and a gold (Au) material having a thickness of 20 nm or a nickel (Ni) material having a thickness of 70 nm superimposed on the PET film by way of a vacuum deposition method. The spacer 40 is made of a PET material having a thickness of 38 $\mu$m. The sensitivity of the condenser microphone thus produced was measured under the conditions that the thickness of the PET film forming part of the diaphragm 51 varies to obtain data indicative of relationship between the thickness of the PET film forming part of the diaphragm 51 and the sensitivity of the condenser sensor 10.

Figure 8:
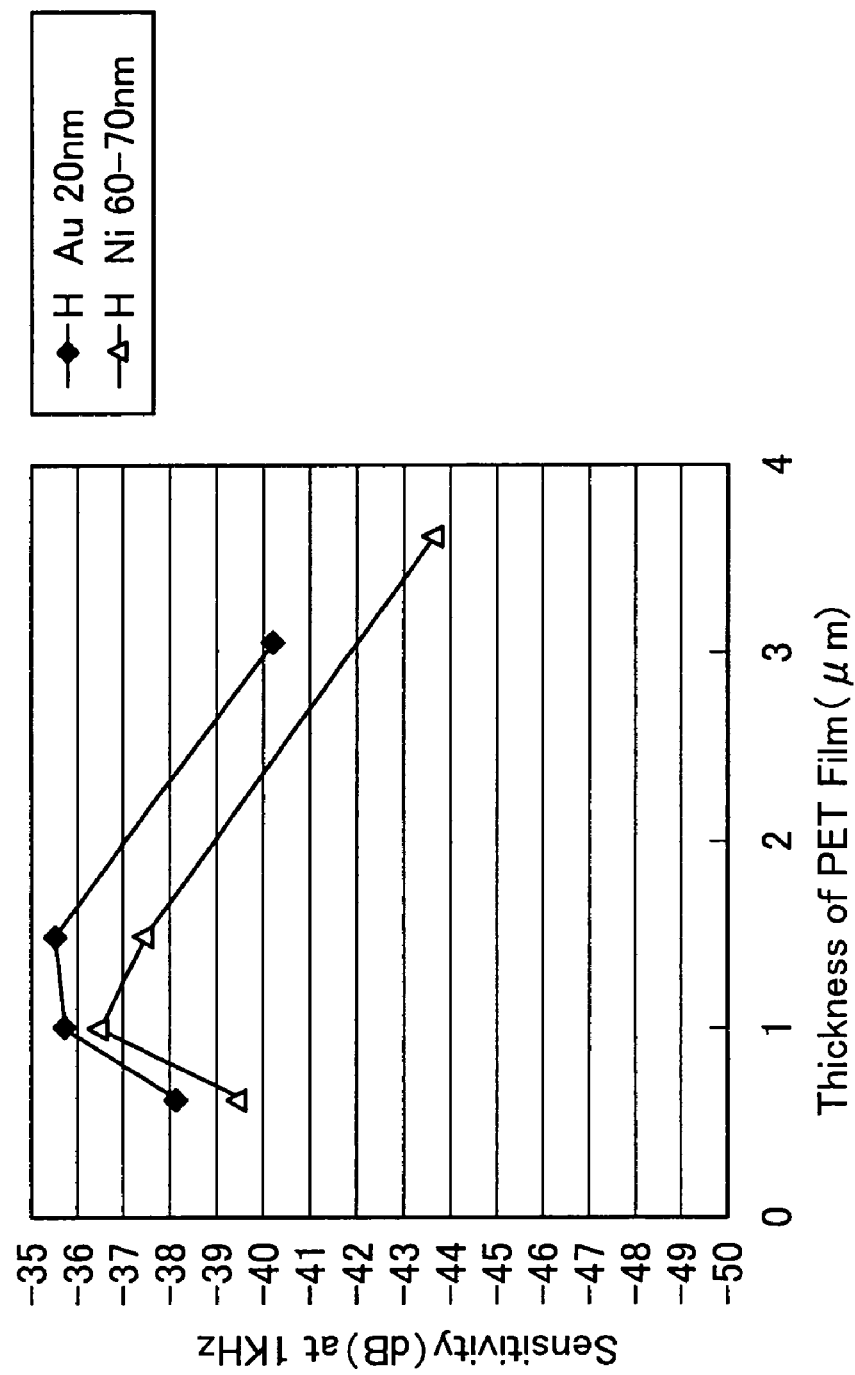
FIG. 8 is a graph showing an experimental result of the condenser sensor shown in FIG. 1.

There are shown in FIG. 8 results of the measurement. As will be seen in FIG. 8, the thickness of the PET film forming part of the diaphragm 51 has an optimal value in terms of the sensitivity of the condenser sensor 10. The sensitivity of the condenser sensor 10 varies widely when the thickness of the diaphragm 51 is less than 1 $\mu$m.

Accordingly, it is concluded that the condenser sensor 10 can enhance its sensitivity as well as improve its yield when the thickness of the diaphragm 51 is greater than 1 $\mu$m but less than 3 $\mu$m.

Further, the additional measurements were performed under the conditions that the diaphragm 51 of the condenser sensor 10 is made of a PPS film, a PEN film, and a PP film. The results of the measurements are approximately the same as that performed under the condition that the diaphragm 51 of the condenser sensor 10 is made of a PET film.

SECOND EXAMPLE

As a second example of the condenser sensor 10 is produced a condenser microphone having a height of 1.4 mm and being in the form of a cylindrical shape with a diameter of 6 mm. Constituent elements forming part of the second example of the condenser sensor 10 are as follows. The electrically conductive case 20 is made of an alloy of nickel, zinc, and copper having a thickness of 0.12 mm, and the electrically insulating member 21 is made of a FEP film fusion-spliced on the alloy of nickel, zinc, and copper forming the electrically conductive case 20. The fixed electrode 30 is made of an SUS material having a thickness of 0.2 mm and an FEP material having a thickness of 2.5 $\mu$m deposited on the SUS material, and electrically charged with voltage of 280V The diaphragm supporting member 52 and the electrically conductive member 53 are made of a SUS material having a thickness of 0.3 mm. The spacer 40 is made of a PP material having a thickness of 30 $\mu$m. The diaphragm 51 is made of a PPS film having a thickness of 2.5 $\mu$m and a gold (Au) material having a thickness of 20 nm superimposed on the PPS film by way of a vacuum deposition method. The sensitivity of the condenser microphone thus produced was measured under the conditions that the diaphragm 51 is held in contact with the diaphragm supporting member 52 with various tensions to obtain data indicative of relationship between the base resonance frequency f0 of the diaphragm 51 and the sensitivity of the condenser sensor 10.

Figure 9:
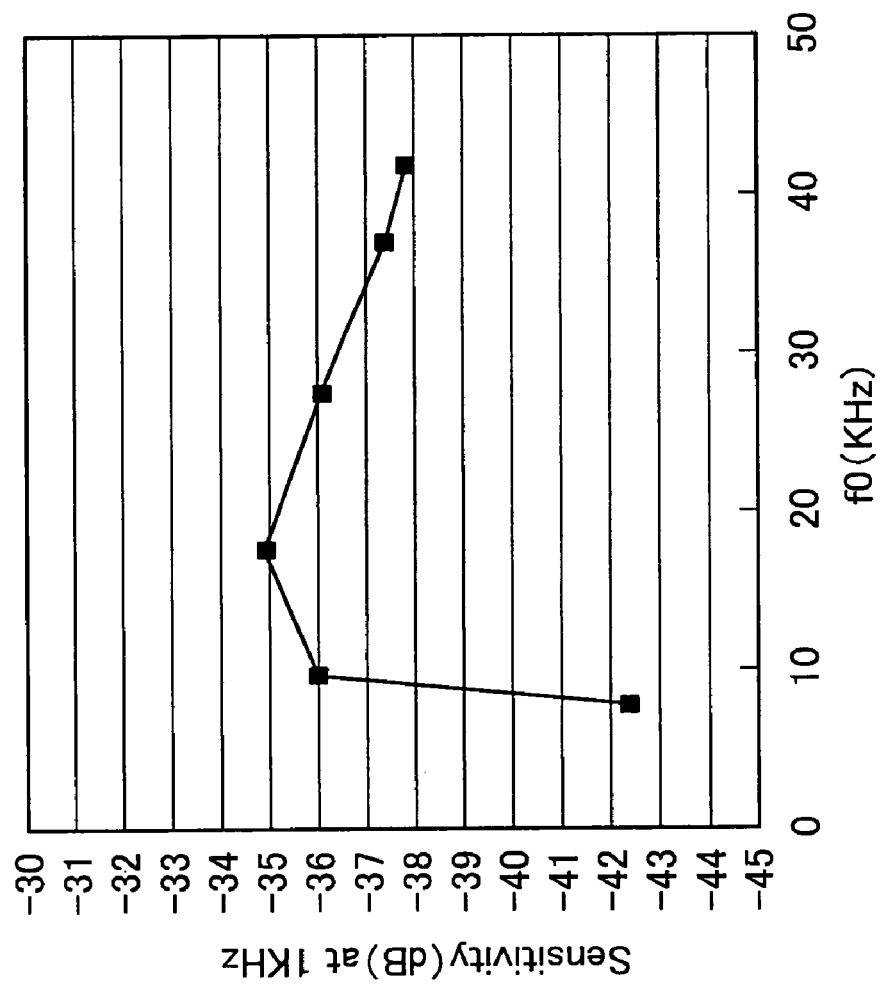
FIG. 9 is a graph similar to FIG. 8 but showing another experimental result of the condenser sensor shown in FIG. 1.

There are shown in FIG. 9 results of the measurement. As will be seen in FIG. 9, the base resonance frequency f0 of the diaphragm 51 has an optimal value in terms of the sensitivity of the condenser sensor 10. The sensitivity of the condenser sensor 10 varies widely when the base resonance frequency f0 of the diaphragm 51 is less than 10 KHz, and the sensitivity of the condenser sensor 10 is deteriorated below a required level when the base resonance frequency f0 of the diaphragm 51 is greater than 35 KHz.

Accordingly, it is concluded that the condenser sensor 10 can enhance its sensitivity as well as improve its yield when the base resonance frequency f0 of the diaphragm 51 is greater than 10 KHz but less than 35 KHz.

Further, the additional measurements were performed under the conditions that the diaphragm 51 of the condenser sensor 10 is made of a PET film, a PEN film, and a PP film. The results of the measurements are approximately the same as that performed under the condition that the diaphragm 51 of the condenser sensor 10 is made of a PPS film.

THIRD EXAMPLE

As a third example of the condenser sensor 10 is produced a condenser microphone having a height of 1.4 mm and being in the form of a cylindrical shape with a diameter of 6 mm. Constituent elements forming part of the third example of the condenser sensor 10 are as follows. The electrically conductive case 20 is made of an alloy of nickel, zinc, and copper having a thickness of 0.12 mm, and the electrically insulating member 21 is made of a resin applied to the alloy of nickel, zinc, and copper forming the electrically conductive case 20. The fixed electrode 30 is made of an SUS material having a thickness of 0.2 mm and an FEP material having various thicknesses deposited on the SUS material, and electrically charged with voltage of 280V. The diaphragm supporting member 52 and the electrically conductive member 53 are made of a SUS material having a thickness of 0.3 mm. The diaphragm 51 is made of a PET film having a thickness of 1.5 $\mu$m and a titanium (Ti) material having a thickness of 40 nm superimposed on the PET film by way of a vacuum deposition method. The sensitivity of the condenser microphone thus produced was measured under the conditions that the thickness of the FEP film forming part of the fixed electrode 30 varies to obtain data indicative of relationship between the thickness of the FEP film forming part of the fixed electrode 30 and the sensitivity of the condenser sensor 10.

Figure 10:
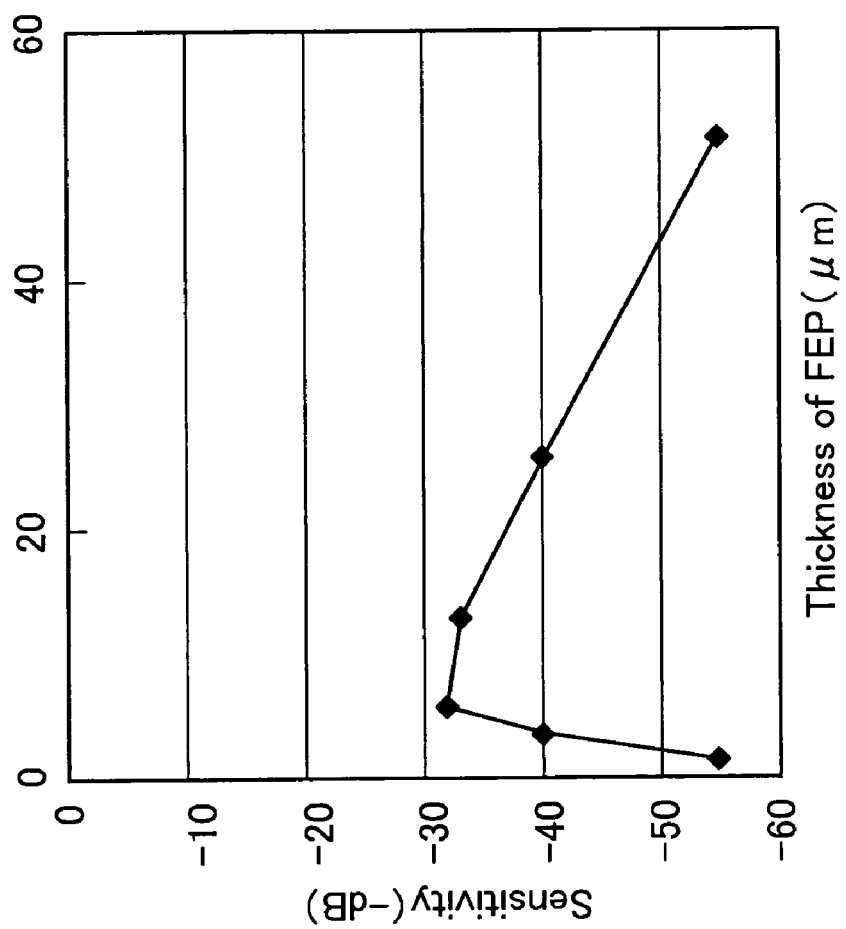
FIG. 10 is a graph similar to FIGS. 8 and 9 but showing yet another experimental result of the condenser sensor shown in FIG. 1.

There are shown in FIG. 10 results of the measurement. As will be seen in FIG. 10, the thickness of the FEP film forming part of the fixed electrode 30 has an optimal value in terms of the sensitivity of the condenser sensor 10. The sensitivity of the condenser sensor 10 varies widely when the thickness of the FEP film forming part of the fixed electrode 30 is less than 3 $\mu$m.

Accordingly, it is concluded that the condenser sensor 10 can enhance its sensitivity as well as improve its yield when the thickness of the electret member 31 is greater than 3 $\mu$m but less than 25 $\mu$m.

FOURTH EXAMPLE

As fourth examples of the condenser sensor 10 are produced a condenser microphone having a height of approximately 1.5 mm and being in the form of a cylindrical shape with a diameter of 4 mm, and a condenser microphone having a height of approximately 1.0 mm and being in the form of a cylindrical shape with a diameter of 6 mm. Constituent elements forming part of the fourth examples of the condenser sensor 10 are as follows. The electrically conductive case 20 is made of an alloy of nickel, zinc, and copper having a thickness of 0.12 mm, and the electrically insulating member 21 is made of an electrically insulating layer applied to the alloy of nickel, zinc, and copper forming the electrically conductive case 20. The fixed electrode 30 is made of an SUS material having a thickness of 0.1 mm and an FEP material having a thickness of 12.5 $\mu$m deposited on the SUS material, and electrically charged with voltage in the range of 200V to 300V. The diaphragm supporting member 52 is made of a SUS material having a thickness of 0.4 mm. The condenser microphone having a height of approximately 1.5 mm and being in the form of a cylindrical shape with a diameter of 4 mm has an electrically conductive member 53 made of a SUS material having a thickness of 0.4 mm, while, on the other hand, the condenser microphone having a height of approximately 1.0 mm and being in the form of a cylindrical shape with a diameter of 6 mm has no electrically conductive member 53. The diaphragm 51 is made of a PET film having a thickness of 2.5 $\mu$m and a nickel (Ni) material having a thickness of 70 nm superimposed on the PET film by way of a vacuum deposition method. The spacer 40 is made of a PET material having a thickness of 38 $\mu$m. The sensitivities of the condenser microphones thus produced were measured.

As results of the measurements, it was proved that the sensitivity of the condenser microphone having a height of approximately 1.5 mm and being in the form of a cylindrical shape with a diameter of 4 mm reaches to a level of −48 dB to −44 dB while, on the other hand, the sensitivity of the condenser microphone having a height of approximately 1.0 mm and being in the form of a cylindrical shape with a diameter of 6 mm reaches to a high level of −45 dB to −38 dB. Further, the frequency characteristics of the above condenser microphones are proved to be approximately the same until the frequency reaches to 20 KHz.

FIFTH EXAMPLE

As a fifth example of the condenser sensor 10 is produced a condenser microphone having a height of 1.5 mm and being in the form of a cylindrical shape with a diameter of 6 mm. Constituent elements forming part of the fifth example of the condenser sensor 10 are as follows. The electrically conductive case 20 is made of an alloy of nickel, zinc, and copper having a thickness of 0.12 mm, and the electrically insulating member 21 is made of an electrically insulating layer applied to the alloy of nickel, zinc, and copper forming the electrically conductive case 20. The fixed electrode 30 is made of an SUS material having a thickness of 0.1 mm and an FEP material having a thickness of 12.5 $\mu$m, and electrically charged with voltage in the range of 200V to 300V. The diaphragm supporting member 52 and the electrically conductive member 53 are made of a SUS material having a thickness of 0.4 mm. The diaphragm 51 is made of a PET film having a thickness of 1.5 $\mu$m and a nickel (Ni) material having a thickness of 70 nm superimposed on the PET film by way of a vacuum deposition method. The spacer 40 is made of a PET material having a thickness of 38 $\mu$m. The sensitivity of the condenser microphone thus produced was measured.

As a result of the measurement, it was proved that the sensitivity of the fifth example of the condenser sensor 10 reaches to a high level of −37 dB to −30 dB.

Figure 11:
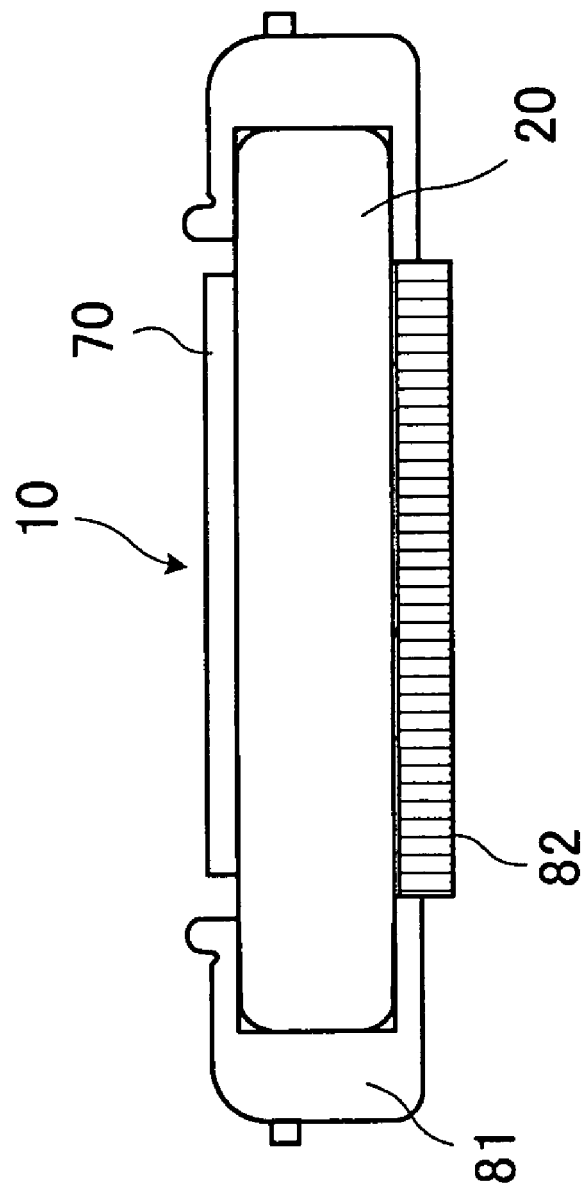
FIG. 11 is a front view showing the condenser sensor shown in FIG. 1 when the condenser sensor shown in FIG. 1 is used as a microphone.

An experiment was conducted to produce a condenser microphone after mounting on the condenser sensor 10 as previously described an elastomer 81 and an electrically conductive elastomer 82 as shown in FIG. 11 to damp the vibration of the condenser sensor 10, and use the condenser microphone thus produced as a microphone forming part of a cellular mobile phone, not shown in the drawings after replacing a regular microphone forming part of the cellular mobile phone with the condenser microphone thus produced. The experiment was further conducted in such a manner that a plurality of operators spoke up to respective condenser microphones forming part of cellular mobile phones apart from themselves with a distance of approximately 30 cm. As a result of the above experiment, it was proved that each of the operators can clearly hear the conversations of the other operators, which usually cannot be heard by the operators operating cellular mobile phones having regular microphones. In FIG. 8, the elastomer 81 may be made of a rubber, and the electrically conductive elastomer 82 may be made of a spring.

The method of producing the present embodiment of the condenser sensor will be described hereinlater. The method of producing the condenser sensor 10 is performed through the steps including a first step, a second step, and a third step.

In the first step, a fixed electrode 30 having an electret member 31 attached thereto, a spacer 40, a diaphragm supporting member 52 having a diaphragm 51 mounted thereon, an electrically conductive member 53, and a circuit packaging board 60 are in turn inserted into an electrically conductive case 20 having an electrically insulating member 21 attached thereto as shown in FIG. 2.

In the second step, the circuit packaging board 60 is held in pressing contact with the portion 20b of the electrically conductive case 20 by a curling or caulking method to have the fixed electrode 30, the electret member 31, the spacer 40, the diaphragm 51, the diaphragm supporting member 52, the electrically conductive member 53, and the circuit packaging board 60 fixedly accommodated in the electrically conductive case 20.

In the third step, an electrically conductive cloth 70 is fixedly mounted on the electrically conductive case 20. The condenser sensor 10 is then produced.

The circuit packaging board 60 having a bare chip of the integrated circuit (IC) mounted thereon makes it possible to narrow a gap between the diaphragm 51 and the circuit packaging board 60, and accordingly, lower the height of the condenser sensor 10 in comparison with the circuit packaging board 60 having a package of the integrated circuit (IC) mounted thereon. This leads to the fact that the circuit packaging board 60 preferably has a bare chip of the integrated circuit (IC) mounted thereon.

Figure 12:
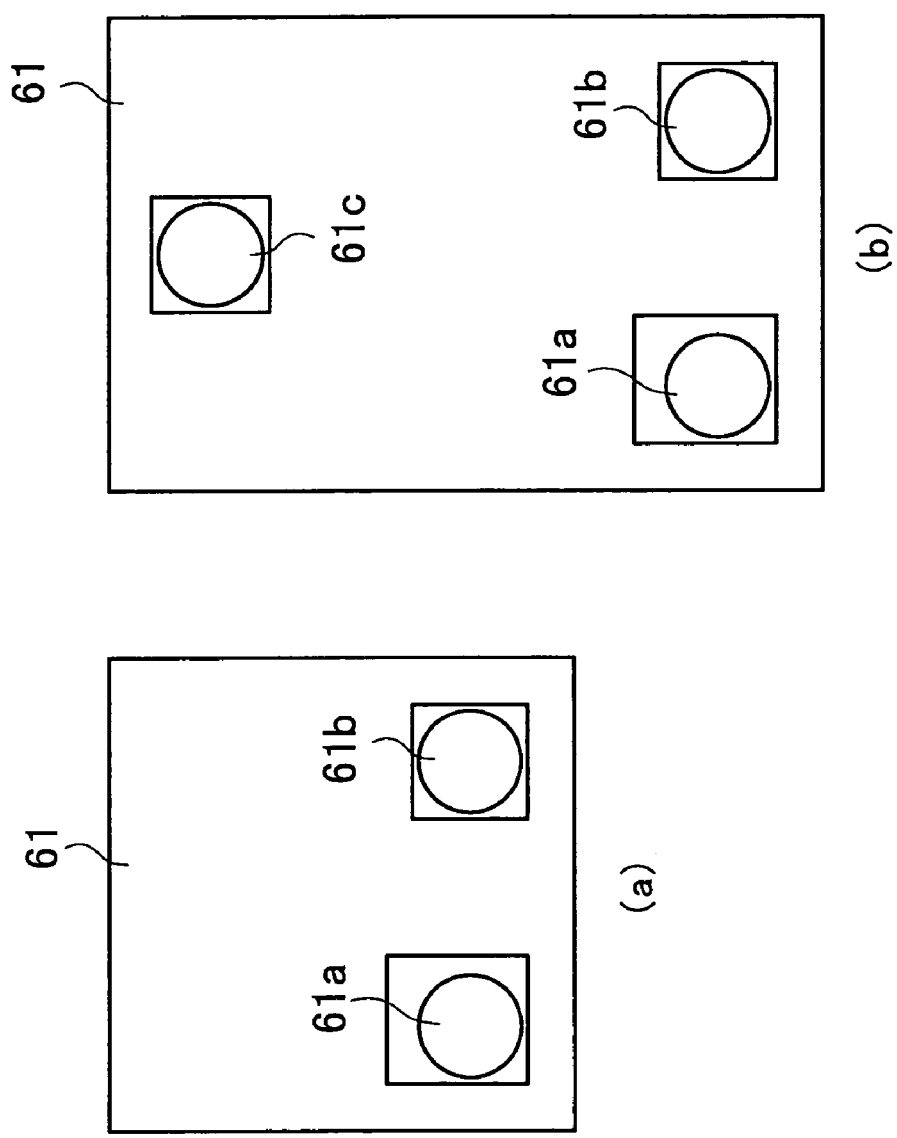
FIG. 12($a$) is a rear view showing an FET mounted on a circuit packaging board of the condenser sensor shown in FIG. 1.

As shown in FIG. 12(a), the bare chip of the FET 61 may have electrodes, i.e., a drain 61a and a source 61b on its rear surface, and a gate on its front surface, not shown in the drawings. Alternatively, as shown in FIG. 12(b), the bare chip of the FET 61 may have electrodes, i.e., a drain 61a, a source 61b, and a gate 61c on its rear surface. Each of the electrodes can be processed by way of a well-known technology applicable to the bare chip, such as for example stat bump, plated bump, solder ball, and/or the like.

In the case that the bare chip of the FET 61 has electrodes as shown in FIG. 12(a), the drain 61a and the source 61b appearing on the rear surface of the bare chip are mounted on a land of the circuit packaging board 60 by way of a flip chip bonding, and then the gate of the bare chip appearing on the front surface of the bare chip is electrically connected with a mounting surface of the circuit packaging board 60 by way of, for example, a wire bonding. In the case that the bare chip of the FET 61 has electrodes as shown in FIG. 12(b), the drain 61a, the source 61b, and the gate 61c appearing on the rear surface of the bare chip can be simultaneously mounted on a land of the circuit packaging board 60 by way of a flip chip bonding.

While the circuit packaging board 60 is produced, a bare chip of the integrated circuit (IC) is mounted thereon as follows.

Firstly, a paste 63 such as for example a non-conductive paste, hereinlater simply referred to as "NCP", an anisotropic conductive paste, hereinlater simply referred to as "ACP", or the like as shown in FIG. 13(b), is applied to a raw circuit board 62 such as for example a glass epoxy board, an aluminum substrate, or the like, having a plurality of electrodes 62a mounted thereon as shown in FIG. 13(a). Heat and pressing force are imparted to a plurality of bare chips of the FETs 61 as shown in FIG. 13(c) to be held in pressing contact with the paste 63 to have the bare chips of the FETs 61 temporally bonded to the raw circuit board 62 with high positioning accuracy. Here, to the raw circuit board 62 may be applied a non-conductive film, hereinlater simply referred to as "NCF", or an anisotropic conductive film, hereinlater simply referred to as "ACF" in place of the paste 63.

Secondly, heat and pressing force are further imparted to a plurality of FETs 61 temporally bonded to the raw circuit board 62 one after another or simultaneously using a hot pressing device 91 as shown in FIG. 13(d) to have the FETs 61 completely bonded to the raw circuit board 62. Here, the FETs 61 may be bonded to the raw circuit board 62 by way of another bare chip bonding technology such as for example ultrasonic bonding in place of the above hot pressing bonding.

Thirdly, a plurality of cream solders 64 as shown in FIG. 13(e) are printed on the raw circuit board 62, and if required, chip elements 65 such as for example capacitor elements, resistance elements, inductive elements, varistor elements, and the like as shown in FIG. 13(f) are mounted on the cream solders 64 printed on the raw circuit board 62. The chip elements 65 are then mounted on the raw circuit board 62 by way of reflowing process as shown in FIG. 13(g). The circuit board is then produced.

Fourthly, a plurality of circuit packaging boards 60 as shown in FIG. 13(h) are taken out from the circuit board. The circuit packaging boards 60 are thus produced. In the case that the circuit board is in a half-blanking state caused by, for example, push back, or the circuit board is in advance separated into a plurality of pieces, the bare chips cannot be temporally bonded to the raw circuit board 62 with high positioning accuracy, thereby aggravating efficiency of the mounting processes. The fact that a plurality of circuit packaging boards 60 are taken out from the circuit board as shown in FIG. 13(g) leads to the fact that dust rising from the periphery of each of the circuit packaging boards 60 is prevented as well as production yield is improved.

Figure 13:
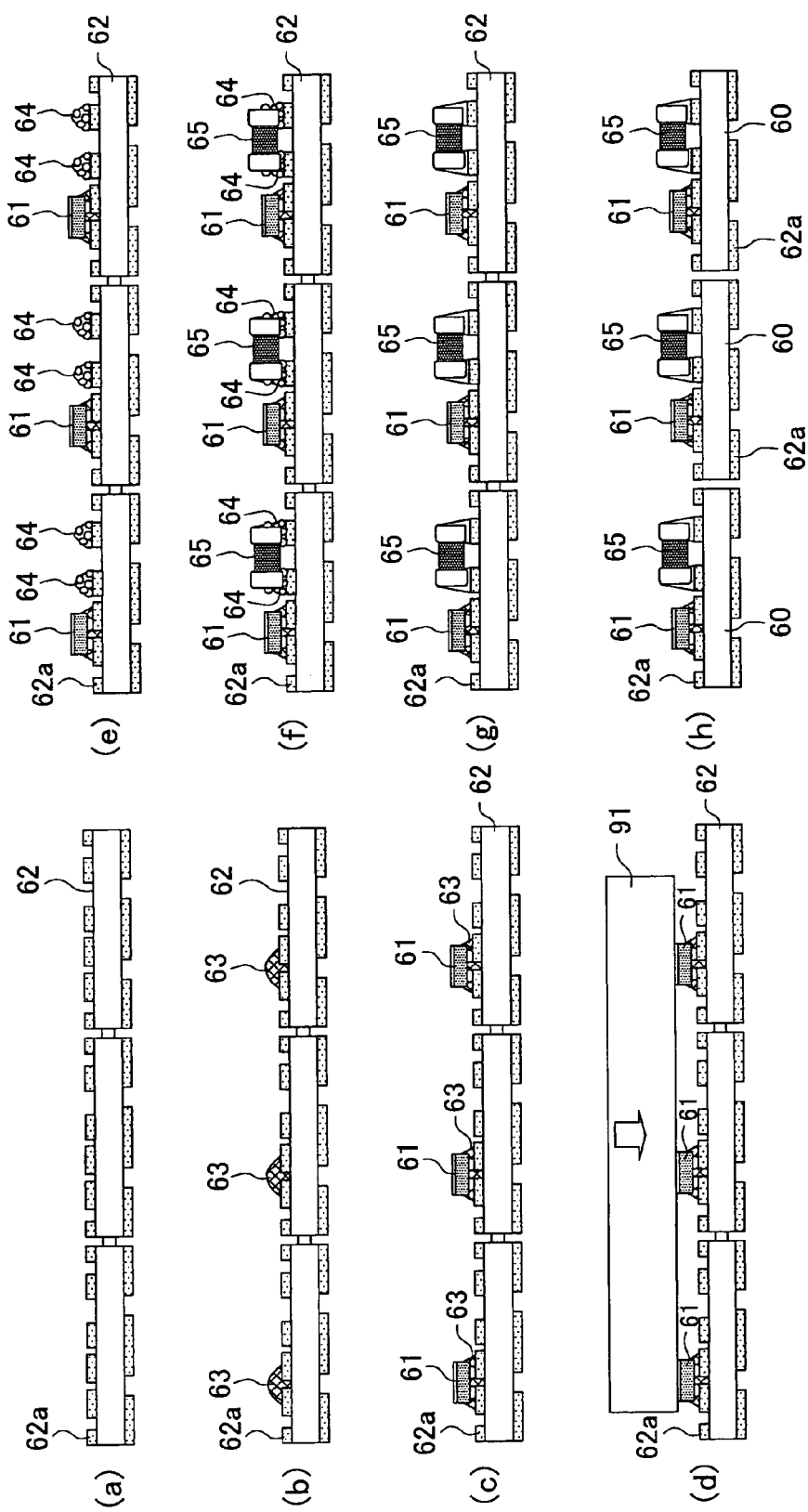
FIGS. 13($a$) through ($h$) are side views each showing the circuit packaging board of the condenser sensor shown in FIG. 1 in a manufacturing process.

While it has been described in the above with reference to FIG. 13 that a plurality of bare chips of the FETs 61 are mounted on the raw circuit board 62 before the chip elements 65 are mounted on the raw circuit board 62, the chip elements 65 may be mounted on the raw circuit board 62 before a plurality of bare chips of the FETs 61 are mounted on the raw circuit board 62. In addition, the circuit packaging board 60 may comprise a sheet device having circuit patterns, capacitor elements, resistance elements, and/or inductive elements formed on, for example, a polyimide sheet by a thin film process such as for example a sputtering method, in place of the chip elements.

Figure 14:
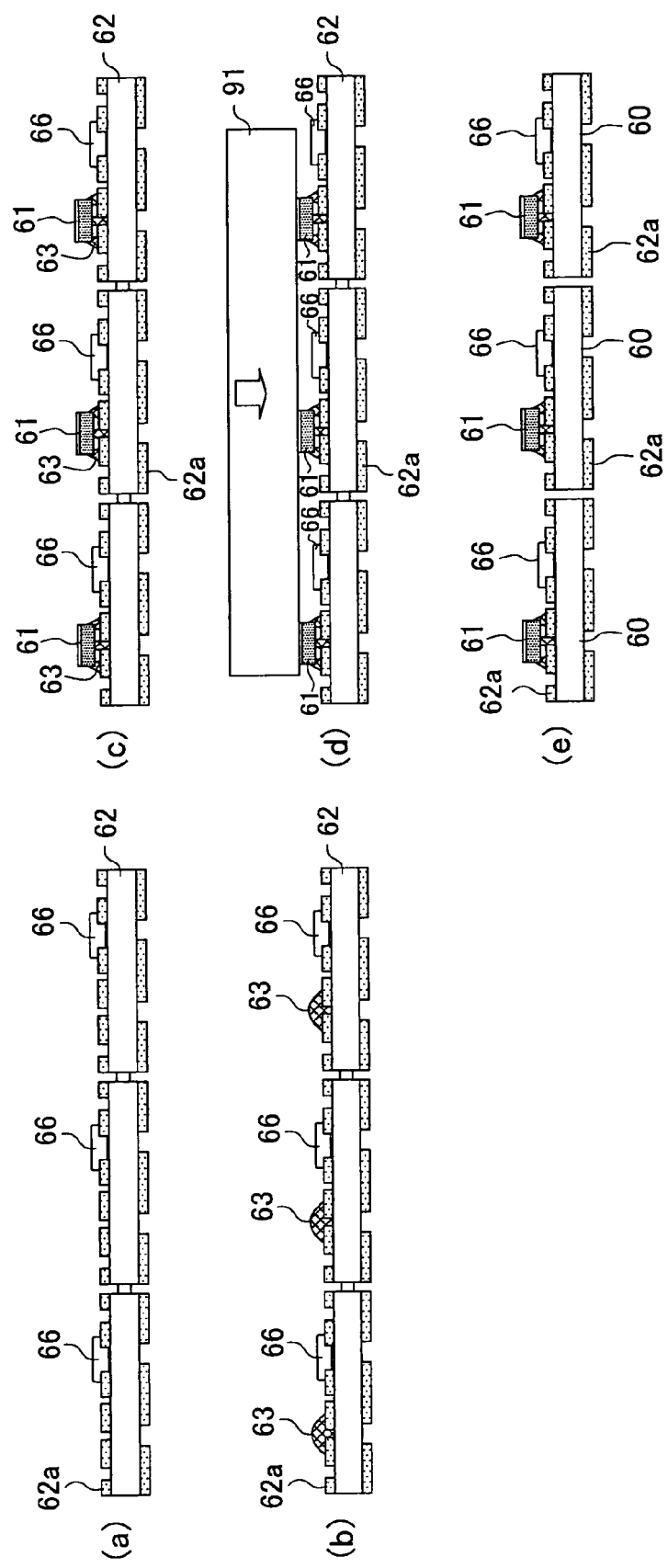
FIGS. 14($a$) through ($e$) are side views similar to FIGS. 13($a$) through ($h$) but each showing another example of the circuit packaging board of the condenser sensor shown in FIG. 1 in a manufacturing process.

For example in the case that elements 66 such as for example capacitor elements, resistance elements, and/or inductive elements are in advance formed on the raw circuit board 62 by way of a printing process and/or a thin film process as shown in FIG. 14(*a*), a gap between the diaphragm 51 and the circuit packaging board 60 can be narrowed, and accordingly, the height of the condenser sensor 10 can be lowered in comparison with the case that the chip elements 65 are later mounted on the raw circuit board 62 as described with reference to FIG. 13.

In the case that the elements 66 are in advance formed on the raw circuit board 62 by way of a printing process and/or a thin film process as shown in FIG. 14(*a*), it is preferable that the circuit packaging board 60 is produced through the following steps.

Firstly, a plurality of pastes 63 as shown in FIG. 14(*b*) are applied to a raw circuit board 62 having a plurality of elements 66 formed thereon by way of a printing process and/or a thin film process as shown in FIG. 14(*a*). Heat and pressing force are imparted to a plurality of bare chips of the FETs 61 as shown in FIG. 14(*c*) to be held in pressing contact with the paste 63 to have the bare chips of the FETs 61 temporally bonded to the raw circuit board 62 with high positioning accuracy. Here, to the raw circuit board 62 may be applied an NCF, or an ACF in place of the paste 63.

Secondly, heat and pressing force are further imparted to a plurality of FETs 61 temporally bonded to the raw circuit board 62 one after another or simultaneously using a hot pressing device 91 as shown in FIG. 14(*d*) to have the FETs 61 completely bonded to the raw circuit board 62. The circuit board is then produced. Here, the FETs 61 may be bonded to the raw circuit board 62 by way of another bare chip bonding process such as for example ultrasonic bonding in place of the above hot pressing bonding.

Thirdly, a plurality of circuit packaging boards 60 as shown in FIG. 14(3) are taken out from the circuit board. The circuit packaging boards 60 are thus produced.

Figure 15:
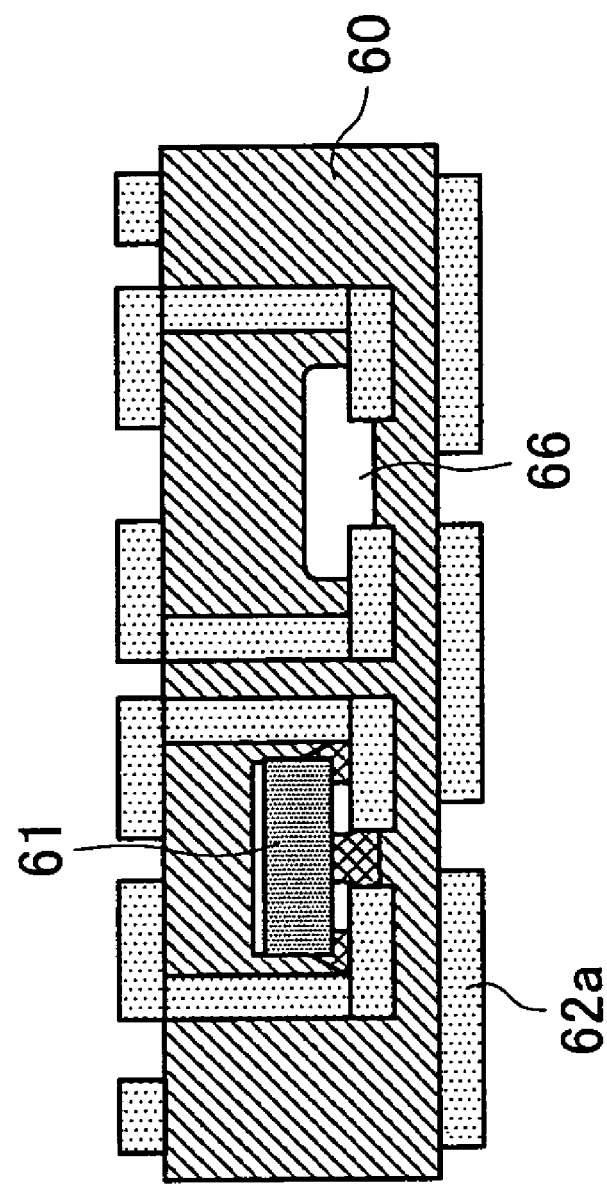
FIG. 15 is a side view similar to FIGS. 13 and 14 but showing yet another example of the circuit packaging board of the condenser sensor shown in FIG. 1.

While it has been described in the above with reference to FIGS. 13(*h*) and 14(*e*) that the circuit packaging board 60 comprises FETs 61 and the elements 66 mounted on a surface of the circuit packaging board 60, the circuit packaging board 60 may comprise FETs 61 and the elements 66 embedded in the circuit packaging board 60 as shown in FIG. 15. The term "mounted on the circuit packaging board" herein used is intended to mean not only "mounted on a surface of the circuit packaging board" but also "embedded in the circuit packaging board". In the case that the circuit packaging board 60 comprises FETs 61 and the elements 66 embedded in the circuit packaging board 60, a gap between the diaphragm 51 and the circuit packaging board 60 can be narrowed, and accordingly, the height of the condenser sensor 10 can be lowered in comparison with the case that the circuit packaging board 60 comprise FETs 61 and the elements 66 mounted on the surface of the circuit packaging board 60.

While it has been described in the above that the circuit packaging board 60 comprises bares IC chips of the FETs 61, the circuit packaging board 60 may comprise a bare chip of an IC (integrated circuit) having a speech recognition circuit, a digital audio amplifier, an analog audio amplifier, and/or the like, formed therein, a bare chip of an IC (integrated circuit) having a capacitance element, a resistance element, and/or the like, formed therein, or a bare chip of an IC (integrated circuit) having a high-frequency circuit, which will be described later, formed therein.

Figure 16:
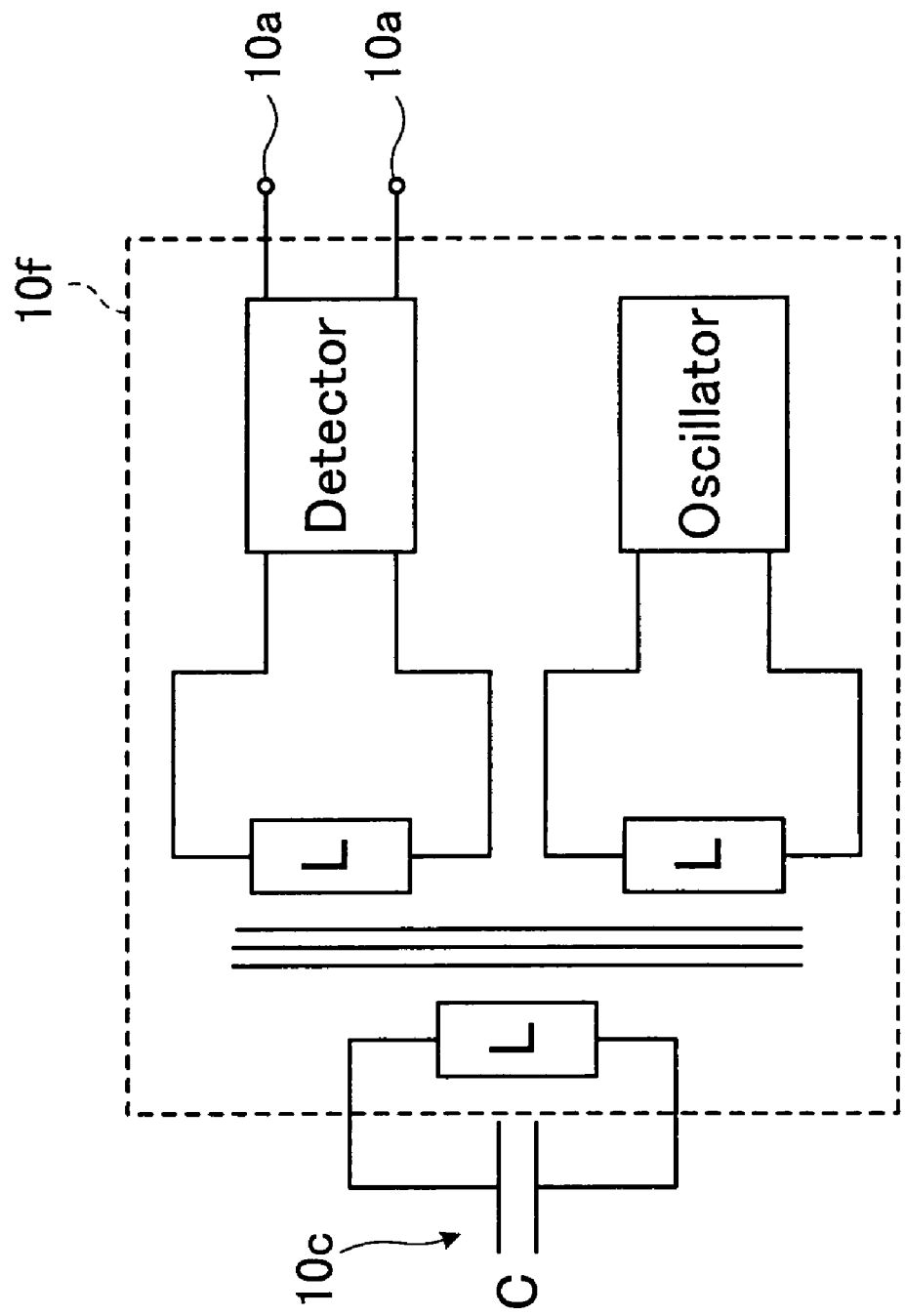
FIG. 16 is a schematic circuit diagram similar to FIGS. 3($a$) and FIG. 7 but showing yet another example of the condenser sensor shown in FIG. 1.

As described hereinearlier, the condenser sensor 10 can function as a condenser microphone because of the fact that the condenser sensor 10 comprises an electret member 31 attached to the fixed electrode 30. The condenser sensor 10, however, may not comprise an electret member 31 attached to the fixed electrode 30 nor an electret member 31 attached to the diaphragm 51. In the case that the condenser sensor 10 comprises no electret member 31, the condenser sensor 10 can function as a high-frequency condenser microphone in such a manner that resonance characteristics of a capacitance of a condenser constituted by the fixed electrode 30 and the diaphragm 51 and a self-inductance L of a coil spring are utilized as shown in FIG. 16. The condenser sensor 10 may further comprise a bare chip of a circuit 10*f* shown in FIG. 16 mounted on the circuit packaging board 60.

(A Second Preferred Embodiment)

The construction of a second embodiment of the front electret type condenser sensor will be described first.

The elements or parts of the present embodiment of the front electret type condenser sensor substantially the same as those of the first embodiment of the front electret type condenser sensor 10 shown in FIG. 1 will not be described in detail but bear the same reference numerals and legends as those of the first embodiment of the front electret type condenser sensor 10.

Figure 17:
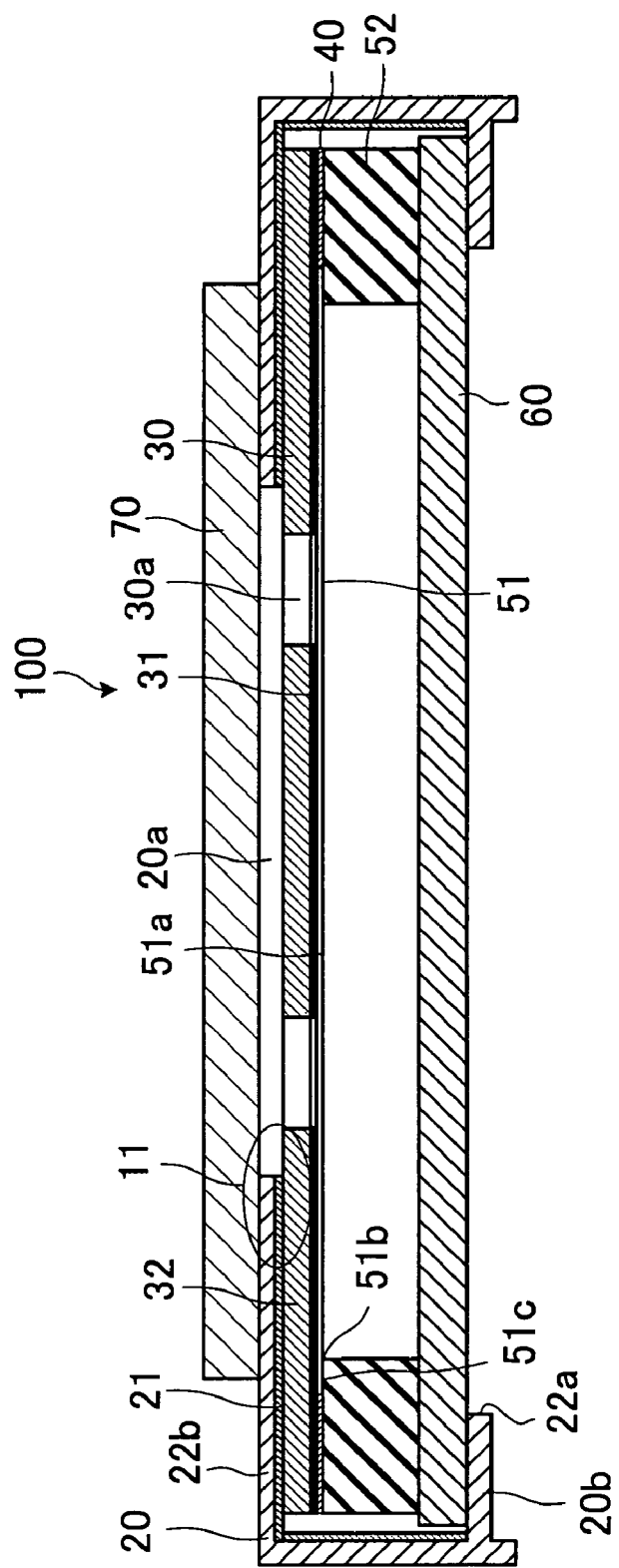
FIG. 17 is a cross-sectional side view showing a second embodiment of the condenser sensor.

The present embodiment of the front electret type condenser sensor 100 is shown in FIG. 17 as comprising an electrically insulating member 21 attached to both surfaces of the electrically conductive case 20 including the surface having an acoustic aperture 20*a* formed therein, and held in contact with the fixed electrode 30.

The electrically conductive case 20 is electrically connected with the fixed electrode 30 through an electrically conductive member 11 produced by laser welding.

The electrically conductive case 20 having the electrically insulating member 21 attached thereto can be readily produced through the step of drawing, for example, a metal sheet having an electrically insulating resin fusion-spliced or deposited thereon into a shape of the case. This means that the present embodiment of the condenser sensor 100 is different from the first embodiment of the condenser sensor 10 in the fact that the preset embodiment of the condenser sensor 100 can be produced without the step of removing the electrically insulating resin formed on the surface of the electrically conductive case 20 having the acoustic aperture 20*a* therein by way of, for example, the blast method or the like. This leads to the fact that the present embodiment of condenser sensor 100 can be readily produced in comparison with the first embodiment of the condenser sensor 10.

The method of producing the present embodiment of the condenser sensor will be described hereinlater. The method of producing the condenser sensor 100 is performed through the steps including a first step, a second step, and a third step.

In the first step, a fixed electrode 30 having an electret member 31 attached thereto, a spacer 40, a diaphragm supporting member 52 having a diaphragm 51 mounted thereon, and a circuit packaging board 60 are in turn inserted into an electrically conductive case 20 having an electrically insulating member 21 attached thereto.

In the second step, the circuit packaging board 60 is held in pressing contact with the portion 20*b* of the electrically conductive case 20 by a curling or caulking method to have the fixed electrode 30, the electret member 31, the spacer 40, the diaphragm 51, the diaphragm supporting member 52, and the circuit packaging board 60 fixedly accommodated in the electrically conductive case 20.

In the third step, the electrically conductive case 20 and the fixed electrode 30 are fixedly connected at an electrically conductive member 11 produced by a laser welding, and then an electrically conductive cloth 70 is fixedly mounted on the electrically conductive case 20. The condenser sensor 100 is then produced.

In addition, the condenser sensor 100 may further comprise an electrically conductive member 53 intervening between the diaphragm supporting member 52 and the circuit packaging board 60, similar to the condenser sensor 10 (see FIG. 2), so as to facilitate adjustment of its height.

Further, instead of producing an electrically conductive member 11 by laser welding, the condenser sensor 100 may have a soldering portion or the fixed electrode 30 may have a projecting portion penetrating through the electrically insulating member 21 for electrically connecting the electrically conductive case 20 with the fixed electrode 30. In the case that the fixed electrode 30 has a projecting portion penetrating through the electrically insulating member 21 to have the electrically conductive case 20 held in electrical contact with the fixed electrode 30, the condenser sensor 100 can be readily produced in comparison with the case that the electrically conductive member 11 produced by a laser welding is utilized.

(A Third Preferred Embodiment)

The construction of a third embodiment of the front electret type condenser sensor will be described first.

The elements or parts of the present embodiment of the front electret type condenser sensor substantially the same as those of the first embodiment of the front electret type condenser sensor 10 shown in FIG. 1 will not be described in detail but bear the same reference numerals and legends as those of the first embodiment of the front electret type condenser sensor 10.

Figure 18:
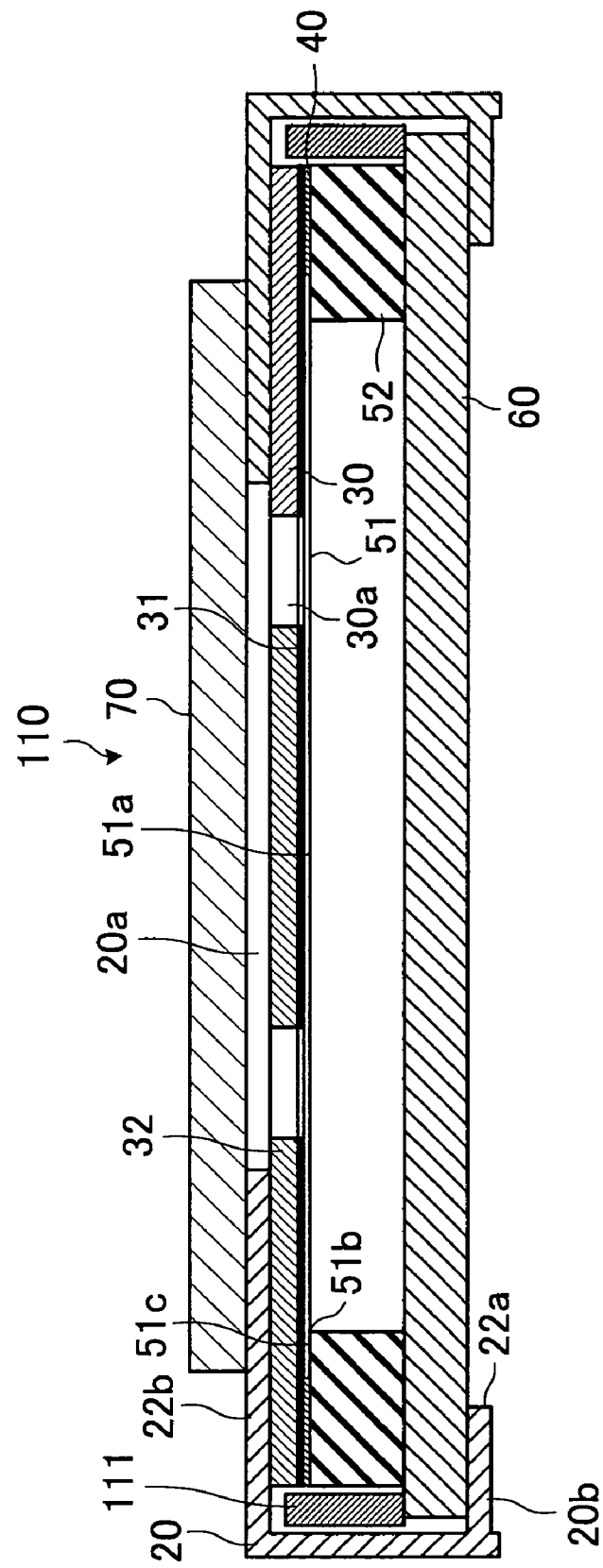
FIG. 18 is a cross-sectional side view showing a third embodiment of the condenser sensor.

The present embodiment of the front electret type condenser sensor 110 is shown in FIG. 18 as comprising an electrically insulating member 111 separated from the electrically conductive case 20 and intervening between the electrically conductive case 20 and the diaphragm supporting member 52 in place of the electrically insulating member 21 (see FIG. 1) attached to the electrically conductive case 20.

The electrically insulating member 111 is required to be thin so that the surface areas of the fixed electrode 30 and the diaphragm 51 are increased for the purpose of enhancing the capacitance between the fixed electrode 30 and the diaphragm 51. On the other hand, the electrically insulating member 111 is required to have a rigidity more than a predetermined level resulting from the fact that the electrically insulating member 111 is mechanically processed and implemented. Preferably, the electrically insulating member 111 may be made of acrylonitrile-styrene copolymer, hereinlater simply referred to as "AS", acrylonitrile butadiene styrene copolymer, hereinlater simply referred to as "ABS", methyl methacrylate, hereinlater referred to as "PMMA", polyacetal, hereinlater simply referred to as "POM", polybutylene terephthalate, hereinlater simply referred to as "PBT", PP, polystyrene, hereinlater simply referred to as "PS", PET, polycarbonate, hereinlater simply referred to as "PC", polyphthalamide, hereinlater simply referred to as "PPA", PPS, polyimide, hereinlater simply referred to as "PI", and liquid crystal polymer, hereinlater simply referred to as "LCP". More preferably, the electrically insulating member 111 may be made of a composite body including the aforementioned resins and a glass, or a composite body including the aforementioned resins and a metal to ensure that the electrically insulating member 111 has a large rigidity. The electrically insulating member 111 may be made of, for example, a composite body including SUS coated with an electrically insulating material.

The present embodiment of the condenser sensor 110 having the electrically insulating member 111 is increased in the number of constitution parts in comparison with the condenser sensor 10 having the electrically insulating member 21 attached to the electrically conductive case 20. The present embodiment of the condenser sensor 110 is simply in construction and easy in production in comparison with the condenser sensor 10. Further, the present embodiment of the condenser sensor 110 is reduced in production process, and therefore, production cost in comparison with the condenser sensor 10 resulting from the fact that the condenser sensor 110 can be produced without the step of attaching the electrically insulating member 21 to the electrically conductive case 20.

The method of producing the present embodiment of the condenser sensor will be described hereinlater. The method of producing the condenser sensor 110 is performed through the steps including a first step, a second step, and a third step.

In the first step, an electrically insulating member 111, a fixed electrode 30 having an electret member 31 attached thereto, a spacer 40, a diaphragm supporting member 52 having a diaphragm 51 mounted thereon, and a circuit packaging board 60 are in turn inserted into an electrically conductive case 20.

In the second step, the circuit packaging board 60 is held in pressing contact with the portion 20b of the electrically conductive case 20 by a curling or caulking method to have the fixed electrode 30, the electret member 31, the spacer 40, the diaphragm 51, the diaphragm supporting member 52, and the circuit packaging board 60 fixedly accommodated in the electrically conductive case 20.

In the third step, an electrically conductive cloth 70 is fixedly mounted on the electrically conductive case 20. The condenser sensor 110 is then produced.

In addition, the condenser sensor 110 may further comprise an electrically conductive member 53 intervening between the diaphragm supporting member 52 and the circuit packaging board 60, similar to the condenser sensor 10 (see FIG. 2), so as to facilitate adjustment of its height.

(A Fourth Preferred Embodiment)

The construction of a fourth embodiment of the front electret type condenser sensor will be described first.

The elements or parts of the present embodiment of the front electret type condenser sensor substantially the same as those of the third embodiment of the front electret type condenser sensor 110 shown in FIG. 18 will not be described in detail but bear the same reference numerals and legends as those of the third embodiment of the front electret type condenser sensor 110.

Figure 19:
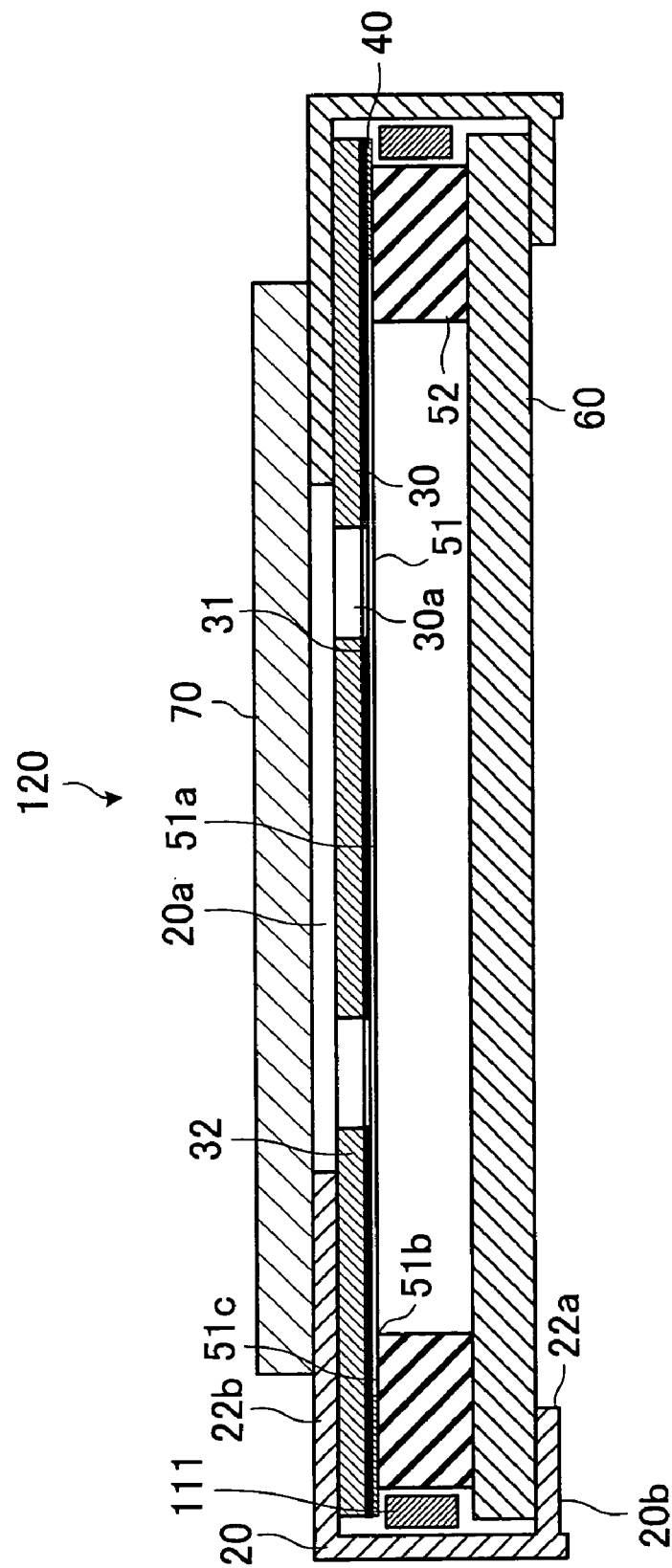
FIG. 19 is a cross-sectional side view showing a fourth embodiment of the condenser sensor.

As will be best seen in FIG. 19, the present embodiment of the front electret type condenser sensor 120 is different from the third embodiment of the front electret type condenser sensor 110 only in the sizes of the fixed electrode 30, the spacer 40, and the electrically insulating member 111.

The method of producing the present embodiment of the condenser sensor will be described hereinlater. The method of producing the condenser sensor 120 is performed through the steps including a first step, a second step, and a third step.

In the first step, a fixed electrode 30 having an electret member 31 attached thereto, a spacer 40, an electrically insulating member 111, a diaphragm supporting member 52 having a diaphragm 51 mounted thereon, and a circuit packaging board 60 are in turn inserted into an electrically conductive case 20.

In the second step, the circuit packaging board 60 is held in pressing contact with the portion 20b of the electrically conductive case 20 by a curling or caulking method to have the fixed electrode 30, the electret member 31, the spacer 40, the diaphragm 51, the diaphragm supporting member 52, and the circuit packaging board 60 fixedly accommodated in the electrically conductive case 20.

In the third step, an electrically conductive cloth 70 is fixedly mounted on the electrically conductive case 20. The condenser sensor 120 is then produced.

The spacer 40 smaller in thickness and weight than the fixed electrode 30 is inserted into the electrically conductive case 20 prior to the electrically insulating member 111. This leads to the fact that spacer 40 will not get stuck with the electrically insulating member 111 while the spacer is inserted into the electrically conductive case 20, and therefore, the condenser sensor 120 can be readily produced.

In addition, the fact that the condenser sensor 110 is smaller in the sizes of the fixed electrode 30 and the spacer 40 than the condenser sensor 120 leads to the fact that the condenser sensor 110 can be reduced in material cost in comparison with the condenser sensor 120.

Further, the condenser sensor 120 may further comprise an electrically conductive member 53 intervening between the diaphragm supporting member 52 and the circuit packaging board 60, similar to the condenser sensor 10 (see FIG. 2), so as to facilitate adjustment of its height.

(A Fifth Preferred Embodiment)

The construction of a fifth embodiment of the front electret type condenser sensor will be described first. The elements or parts of the present embodiment of the front electret type condenser sensor substantially the same as those of the first embodiment of the front electret type condenser sensor 10 shown in FIG. 1 will not be described in detail but bear the same reference numerals and legends as those of the first embodiment of the front electret type condenser sensor 10.

Figure 20:
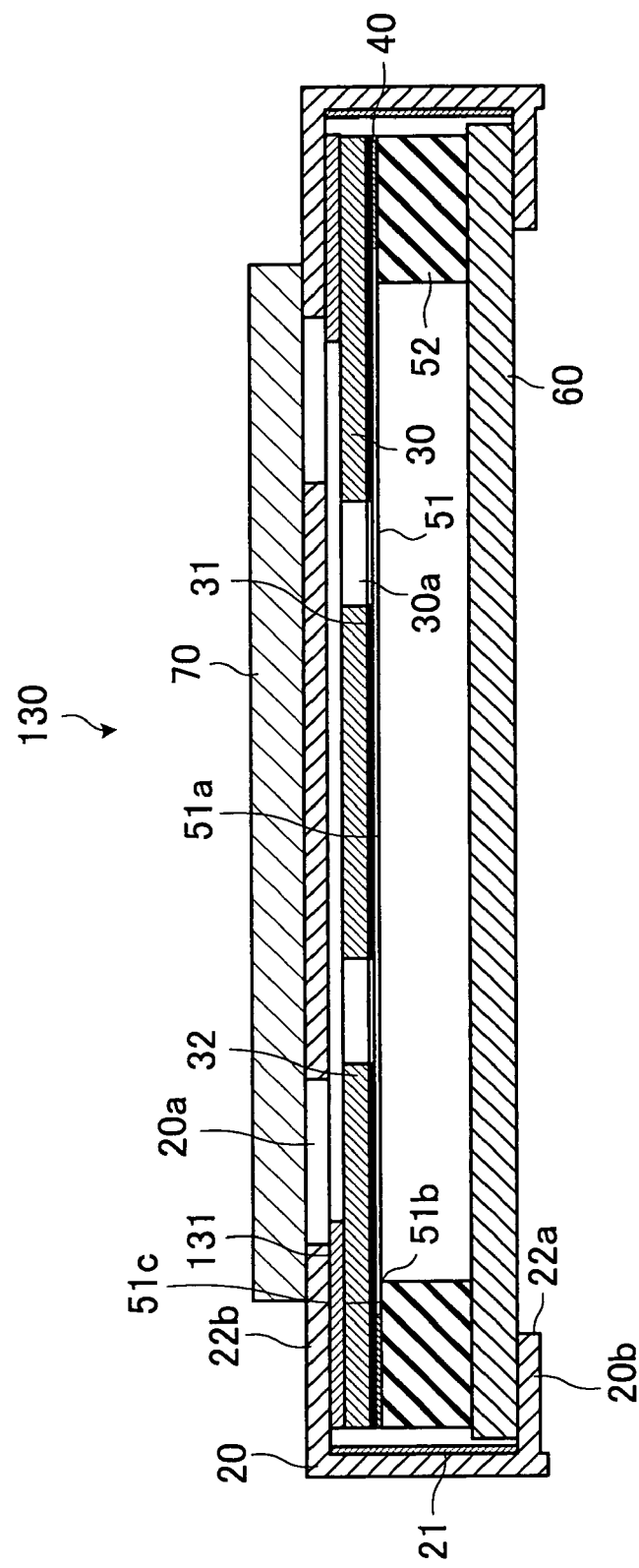
FIG. 20 is a cross-sectional side view showing a fifth embodiment of the condenser sensor.
Figure 21:
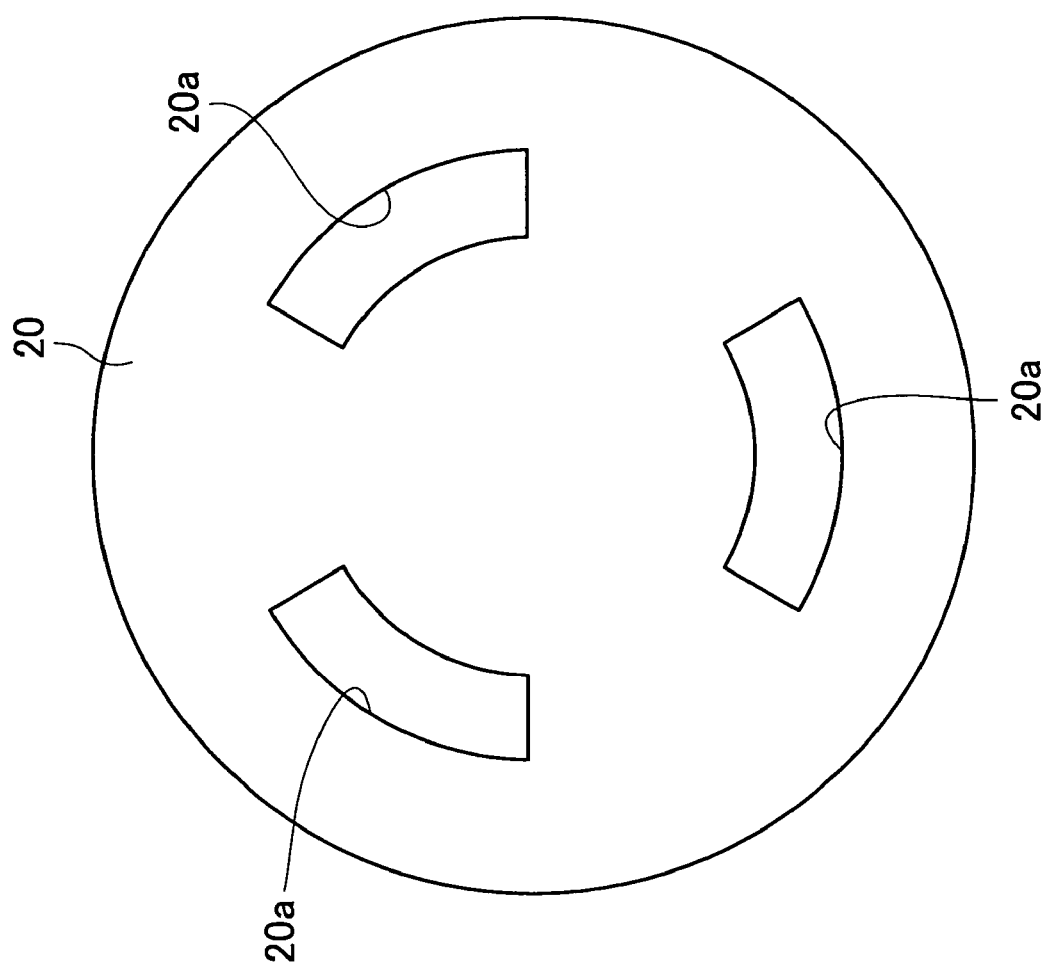
FIG. 21 is a plan view showing an electrically conductive case of the condenser sensor shown in FIG. 20.

The present embodiment of the front electret type condenser sensor 130 is shown in FIG. 20 as further comprising an electrically conductive spacer 131 intervening between the electrically conductive case 20 and the fixed electrode 30. Furthermore, the present embodiment of the condenser sensor 130 is different from the first embodiment of condenser sensor 10 in the acoustic apertures 20a formed in the electrically conductive case 20. The acoustic apertures 30a formed in the fixed electrode 30 are respectively opposing to a portion of the electrically conductive case 20 having no acoustic aperture 20a formed therein. This means that each of the acoustic apertures 30a formed in the fixed electrode 30 is disposed in opposing relationship with none of the acoustic apertures 20a formed in the electrically conductive case 20. For example in the case that the condenser sensor 130 is in the form of a cylindrical shape, the electrically conductive case 20 is formed with a plurality of acoustic apertures 20a as shown in FIG. 21.

Preferably, the electrically conductive spacer 131 may be made of a metal material for rigidity and electrical conductivity.

In the present embodiment of the condenser sensor 130, the electrically conductive case 20 is spaced apart from the fixed electrode 30 across the electrically conductive spacer 131 while, on the other hand, in the first embodiment of the condenser sensor 10, the electrically conductive case 20 is held in contact with the fixed electrode 30. This leads to the fact that the condenser sensor 130 can prevent exterior electromagnetic noise from reaching to and influencing on the diaphragm 51 in comparison with the condenser sensor 10 resulting from the fact that the condenser sensor 130 is longer than the condenser sensor 10 in the distance between the surface of the electrically conductive case 20 having acoustic apertures 20a formed therein and the surface of the fixed electrode 30.

Further, in the condenser sensor 130, each of the acoustic apertures 30a formed in the fixed electrode is disposed in opposing relationship with non of the acoustic apertures 20a formed in the electrically conductive case 20 while, on the other hand, in the condenser sensor 10, the acoustic apertures 30a formed in the fixed electrode are respectively disposed in opposing relationship with the acoustic apertures 20a formed in the electrically conductive case 20. This leads to the fact that the present embodiment of the condenser sensor 130 can prevent exterior electromagnetic noise from reaching to and influencing on the diaphragm 51 in comparison with the condenser sensor 10.

As described in the above, the condenser sensor 130 can prevent exterior electromagnetic noise from reaching to and influencing on the diaphragm 51, thereby making it possible for the condenser sensor 130 to comprise, in place of the electrically conductive cloth 70, for example, a non-conductive cloth, which is lower in price than the electrically conductive cloth 70.

The method of producing the present embodiment of the condenser sensor will be described hereinlater. The method of producing the condenser sensor 130 is performed through the steps including a first step, a second step, and a third step.

In the first step, an electrically conductive spacer 131, a fixed electrode 30 having an electret member 31 attached thereto, a spacer 40, a diaphragm supporting member 52 having a diaphragm 51 mounted thereon, and a circuit packaging board 60 are in turn inserted into an electrically conductive case 20.

In the second step, the circuit packaging board 60 is held in pressing contact with the portion 20b of the electrically conductive case 20 by a curling or caulking method to have the electrically conductive spacer 131, the fixed electrode 30, the electret member 31, the spacer 40, the diaphragm 51, the diaphragm supporting member 52, and the circuit packaging board 60 fixedly accommodated in the electrically conductive case 20.

In the third step, an electrically conductive cloth 70 is fixedly mounted on the electrically conductive case 20. The condenser sensor 130 is then produced.

In addition, the condenser sensor 130 may further comprise an electrically conductive member 53 intervening between the diaphragm supporting member 52 and the circuit packaging board 60, similar to the condenser sensor 10 (see FIG. 2), so as to facilitate adjustment of its height.

(A Sixth Preferred Embodiment)

The construction of a sixth embodiment of the front electret type condenser sensor will be described first.

The elements or parts of the present embodiment of the front electret type condenser sensor substantially the same as those of the fourth embodiment of the front electret type condenser sensor 120 shown in FIG. 19 will not be described in detail but bear the same reference numerals and legends as those of the fourth embodiment of the front electret type condenser sensor 120.

Figure 22:
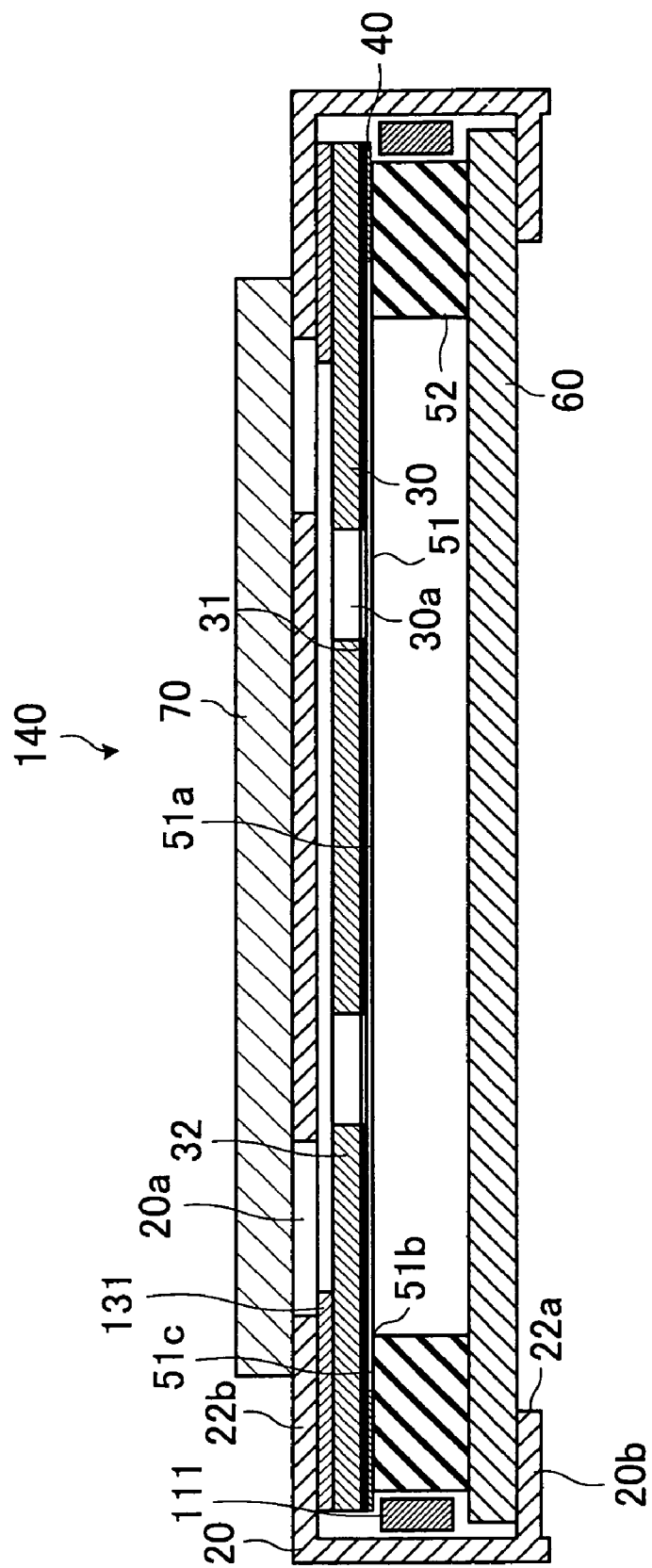
FIG. 22 is a cross-sectional side view showing a sixth embodiment of the condenser sensor.

As will be best seen in FIG. 22, the present embodiment of the front electret type condenser sensor 140 is different from the fourth embodiment of the front electret type condenser sensor 120 only in the fact that the condenser sensor 140 further comprises an electrically conductive spacer 131 intervening between the electrically conductive case 20 and the fixed electrode 30. Furthermore, the present embodiment of the condenser sensor 140 is different from the fourth embodiment of condenser sensor 120 in the acoustic apertures 20a formed in the electrically conductive case 20. The acoustic apertures 30a formed in the fixed electrode 30 are respectively opposing to a portion of the electrically conductive case 20 having no acoustic aperture 20a formed therein. This means that each of the acoustic apertures 30a formed in the fixed electrode 30 is disposed in opposing relationship with none of the acoustic apertures 20a formed in the electrically conductive case 20.

Preferably, the electrically conductive spacer 131 may be made of a metal material for rigidity and electrical conductivity.

In the present embodiment of the condenser sensor 140, the electrically conductive case 20 is spaced apart from the fixed electrode 30 across the electrically conductive spacer 131 while, on the other hand, in the first embodiment of the condenser sensor 120, the electrically conductive case 20 is held in contact with the fixed electrode 30. This leads to the fact that the condenser sensor 140 can prevent exterior electromagnetic noise from reaching to and influencing on the diaphragm 51 in comparison with the condenser sensor 120 resulting from the fact that the condenser sensor 140 is longer than the condenser sensor 120 in the distance between the surface of the electrically conductive case 20 having acoustic apertures 20a formed therein and the surface of the fixed electrode 30.

Further, in the condenser sensor 140, each of the acoustic apertures 30a formed in the fixed electrode is disposed in opposing relationship with non of the acoustic apertures 20a formed in the electrically conductive case 20 while, on the other hand, in the condenser sensor 120, the acoustic apertures 30a formed in the fixed electrode are respectively disposed in opposing relationship with the acoustic apertures 20a formed in the electrically conductive case 20. This leads to the fact that the present embodiment of the condenser sensor 140 can prevent exterior electromagnetic noise from reaching to and influencing on the diaphragm 51 in comparison with the condenser sensor 120.

As described in the above, the condenser sensor 140 can prevent exterior electromagnetic noise from reaching to and influencing on the diaphragm 51, thereby making it possible for the condenser sensor 140 to comprise, in place of the electrically conductive cloth 70, for example, a non-conductive cloth, which is lower in price than the electrically conductive cloth 70.

The method of producing the present embodiment of the condenser sensor will be described hereinlater. The method of producing the condenser sensor 140 is performed through the steps including a first step, a second step, and a third step.

In the first step, an electrically conductive spacer 131, a fixed electrode 30 having an electret member 31 attached thereto, a spacer 40, an electrically insulating member 111, a diaphragm supporting member 52 having a diaphragm 51 mounted thereon, and a circuit packaging board 60 are in turn inserted into an electrically conductive case 20.

In the second step, the circuit packaging board 60 is held in pressing contact with the portion 20b of the electrically conductive case 20 by a curling or caulking method to have the electrically conductive spacer 131, the fixed electrode 30, the electret member 31, the spacer 40, the diaphragm 51, the diaphragm supporting member 52, and the circuit packaging board 60 fixedly accommodated in the electrically conductive case 20.

In the third step, an electrically conductive cloth 70 is fixedly mounted on the electrically conductive case 20. The condenser sensor 140 is then produced.

In addition, the condenser sensor 140 may further comprise an electrically conductive member 53 intervening between the diaphragm supporting member 52 and the circuit packaging board 60, similar to the condenser sensor 10 (see FIG. 2), so as to facilitate adjustment of its height.

(A Seventh Preferred Embodiment)

The construction of a seventh embodiment of the front electret type condenser sensor will be described first. The elements or parts of the present embodiment of the front electret type condenser sensor substantially the same as those of the first embodiment of the front electret type condenser sensor 10 shown in FIG. 1 will not be described in detail but bear the same reference numerals and legends as those of the first embodiment of the front electret type condenser sensor 10.

Figure 23:
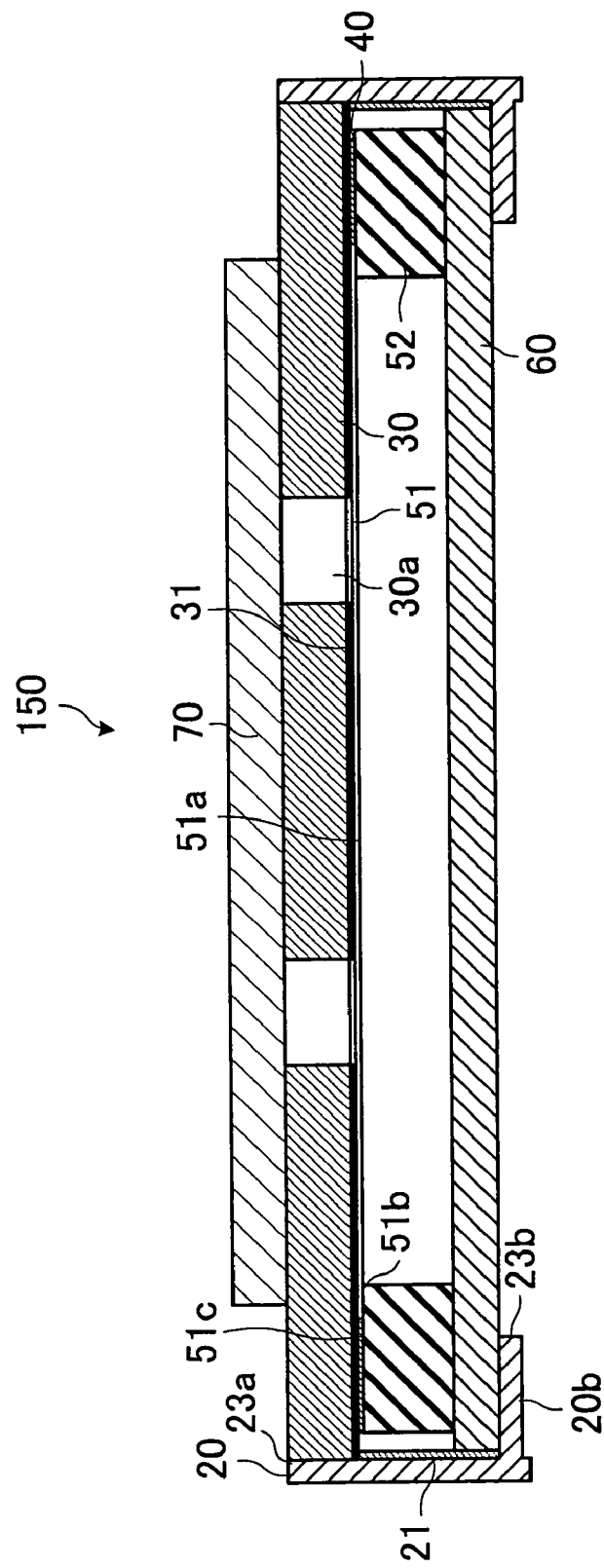
FIG. 23 is a cross-sectional side view showing a seventh embodiment of the condenser sensor.

As will be best seen in FIG. 23, the present embodiment of the front electret type condenser sensor 150 is different from the first embodiment of the front electret type condenser sensor 10 in the fact that the electrically conductive case 20 is formed with opening portions 23a and 23b respectively opposing to each other, and the electrically conductive cloth 70 directly covers the acoustic apertures 30a formed in the fixed electrode 30.

Further, in the condenser sensor 150, the electrically conductive case 20 has no opposite portion 22b partly covering the fixed electrode 30, contrary to the condenser sensor 10 as shown in FIG. 1. This leads to the fact that the condenser sensor 150 can prevent the aggravation of the frequency characteristics caused by the deformation of the electrically conductive case 20.

The method of producing the present embodiment of the condenser sensor will be described hereinlater. The method of producing the condenser sensor 150 is performed through the steps including a first step, a second step, and a third step.

In the first step, a fixed electrode 30 having an electret member 31 attached thereto, a spacer 40, a diaphragm supporting member 52 having a diaphragm 51 mounted thereon, and a circuit packaging board 60 are in turn inserted into an electrically conductive case 20 through the opening portion 23a formed in the electrically conductive case 20.

In the second step, the circuit packaging board 60 is held in pressing contact with the portion 20b of the electrically conductive case 20 by a curling or caulking method to have the electret member 31, the spacer 40, the diaphragm 51, the diaphragm supporting member 52, and the circuit packaging board 60 fixedly accommodated in a spaced defined between the fixed electrode 30 and the electrically conductive case 20.

In the third step, an electrically conductive cloth 70 is fixedly mounted on the fixed electrode 30. The condenser sensor 150 is then produced.

In addition, the condenser sensor 150 may further comprise an electrically conductive member 53 intervening between the diaphragm supporting member 52 and the circuit packaging board 60, similar to the condenser sensor 10 (see FIG. 2), so as to facilitate adjustment of its height.

INDUSTRIAL APPLICABILITY

The present invention provides a condenser sensor, which can avert the aggravation of the frequency characteristics.

The invention claimed is:

1. A condenser sensor, comprising: an electrically conductive case having an opening portion formed therein and an opposing portion opposing to and spaced apart from said opening portion; a fixed electrode received in said electrically conductive case through said opening portion; an electrically conductive diaphragm accommodated in said electrically conductive case, said electrically conductive diaphragm spaced apart from said fixed electrode and opposing to said opening portion; an electrically conductive diaphragm supporting member disposed in said electrically conductive case to support said diaphragm; a circuit packaging board disposed in said electrically conductive case to be held in electrical contact with said fixed electrode and said diaphragm respectively through said electrically conductive case and said diaphragm supporting member; and a deformation protecting member for protecting said opposing portion from being deformed, in which said deformation protecting member intervenes between said electrically conductive case and said diaphragm, said deformation protecting member is disposed inwardly of a circumference of an oscillatable portion of said diaphragm, said electrically conductive case and said fixed electrode are respectively formed with acoustic apertures, a total area of said acoustic aperture formed in said electrically conductive case is larger than a total area of said acoustic aperture formed in said fixed electrode, and said total area of said acoustic aperture formed in said fixed electrode is larger than one thousandth of a total area of said oscillatable portion of said diaphragm but smaller than one tenth of said total area of said oscillatable portion of said diaphragm.

2. A condenser sensor, comprising: an electrically conductive case having an opening portion formed therein and an opposing portion opposing to and spaced apart from said opening portion; a fixed electrode received in said electrically conductive case through said opening portion; an electrically conductive diaphragm accommodated in said electrically conductive case, said electrically conductive diaphragm spaced apart from said fixed electrode and opposing to said opening portion; an electrically conductive diaphragm supporting member disposed in said electrically conductive case to support said diaphragm; a circuit packaging board disposed in said electrically conductive case to be held in electrical contact with said fixed electrode and said diaphragm respectively through said electrically conductive case and said diaphragm supporting member; and a deformation protecting member for protecting said opposing portion from being deformed, in which said deformation protecting member intervenes between said electrically conductive case and said diaphragm, said deformation protecting member is disposed inwardly of a circumference of an oscillatable portion of said diaphragm, and which further comprises an electrically conductive cloth attached to and electrically connected with said electrically conductive case, and in which said electrically conductive case and said fixed electrode are respectively formed with acoustic apertures, and said acoustic aperture of said electrically conductive case is covered by said electrically conductive cloth.

3. A condenser sensor as set forth in claim 1 or claim 2, in which said diaphragm is made of a resin film having a multiple-layer electrically conductive material, said multiple-layer electrically conductive material being selected from among Au, Ni, Pt, Ti, V, W, Ta, and/or any combination thereof, superimposed on said resin film by a sputtering method.

4. A condenser sensor as set forth in claim 1, in which said diaphragm supporting member is made of a composite body including an electrically conductive material and an electrically insulating material, a circumferential portion of said diaphragm is as a whole supported by said electrically conductive material of said diaphragm supporting member and by said electrically insulating material of said diaphragm supporting member, and said diaphragm is bonded to said diaphragm supporting member with an epoxy adhesive.

5. A condenser sensor as set forth in claim 1 or claim 2, in which said diaphragm is made of a multiple-layer material including a resin film and an electrically conductive material superimposed on said resin film, and a thickness of said diaphragm is greater than 1 $\mu$m but less than 2 $\mu$m.

6. A condenser sensor as set forth in claim 1 or claim 2, in which a base resonance frequency of said diaphragm is greater than 10 KHz but less than 35 KHz.

7. A condenser sensor as set forth in claim 1 or claim 2, further comprising: an electret member attached to said fixed electrode, and in which a thickness of said electret member deposited or thermally fusion-spliced on said fixed electrode is greater than 3 $\mu$m but less than 25 $\mu$m.

8. A condenser sensor as set forth in claim 2, in which said electrically conductive cloth is made of a composite body including an electrically conductive material and an electrically insulating material.

9. A condenser sensor as set forth in claim 1 or claim 2, further comprising: an electrically conductive spacer intervening between said electrically conductive case and said fixed electrode, and in which said spacer is less in thickness than said electrically conductive case, and said electrically conductive case and said fixed electrode are respectively formed with acoustic apertures.

10. A condenser sensor as set forth in claim 9, in which said fixed electrode has an aperture portion having said acoustic aperture formed therein and a remaining portion other than said aperture portion, and said acoustic aperture formed in said electrically conductive case is at least partly opposing to said remaining portion of said fixed electrode.

11. A condenser sensor as set forth in claim 1 or claim 2, in which said circumferential portion of said fixed electrode is different in shape from that of said diaphragm.

12. A condenser sensor as set forth in claim 1 or claim 2, in which said electrically conductive case has a surface opposing to said diaphragm supporting member, and which further comprises an electrically insulating member attached to said surface of said electrically conductive case by fusion-splice, deposition, or adhesive bond.

13. A condenser sensor as set forth in claim 1 or claim 2, in which said diaphragm supporting member is held in electrical and physical contact with said circuit packaging board, and which further comprises an electrically insulating member intervening between said electrically conductive case and said diaphragm supporting member, and in which said electrically insulating member is inserted into said electrically conductive case at least before or after said fixed electrode is inserted into said electrically conductive case.

14. A condenser sensor as set forth in claim 13, in which said electrically insulating member is made of a composite body including a metal base material and an electrically insulating material coated on a surface of said metal base material.

15. A condenser sensor as set forth in claim 1 or claim 2, further comprising: an electrically conductive member intervening between said electrically conductive diaphragm supporting member and said circuit packaging board, and in which said circuit packaging board is electrically connected with said electrically conductive diaphragm supporting member through said electrically conductive member.

16. A condenser sensor as set forth in claim 1 or claim 2, further comprising: a terminal electrically connectable to an exterior appliance; and a noise filtering member electrically connected to said terminal to filter out a noise, and in which said noise filtering member is mounted on said circuit packaging board, and includes an capacitor element and resistance element.

17. A condenser sensor as set forth in claim 16, further comprising a varistor chip part electrically connected to said terminal, and mounted on said circuit packaging board.

18. A condenser sensor as set forth in claim 1 or claim 2, further comprising: an element embedded in said circuit packaging board.

19. A condenser sensor as set forth in claim 1 or claim 2, further comprising: a thin film resistor element or a thin film capacitor element formed on said circuit packaging board by way of at least one of a printing process and a thin film processing.

20. A condenser sensor as set forth in claim 1 or claim 2, further comprising: a plurality of bare chips mounted on said circuit packaging board through the steps of imparting pressing force to said bare chips to have said bare chips temporally bonded to said circuit packaging board with resin adhesive and then heat and pressing force are simultaneously imparted to the bare chips to have said bare chips completely bonded to said circuit packaging board.

21. A condenser sensor as set forth in claim 1 or claim 2, in which said electrically conductive case has a surface opposing to said fixed electrode, and which further comprises: an electrically insulating member attached to said surface of said electrically conductive case; and an electrically conductive member electrically connecting said electrically conductive case with said fixed electrode.

* * * * *